United States Patent
Kamoi et al.

(10) Patent No.: US 6,873,621 B2
(45) Date of Patent: Mar. 29, 2005

(54) SYSTEM FOR CONTROLLING AAL1 CELL BANDWIDTH

(75) Inventors: Jyoei Kamoi, Kawasaki (JP); Yoshihiro Uchida, Kawasaki (JP); Naoki Aihara, Kawasaki (JP); Mikio Nakayama, Kawasaki (JP); Kazuhito Yasue, Kawasaki (JP); Kazuhiko Kumagai, Sendai (JP)

(73) Assignee: Fujitsu Limited, Kawasaki (JP)

( * ) Notice: Subject to any disclaimer, the term of this patent is extended or adjusted under 35 U.S.C. 154(b) by 715 days.

(21) Appl. No.: 09/759,176

(22) Filed: Jan. 12, 2001

(65) Prior Publication Data
US 2001/0017858 A1 Aug. 30, 2001

(30) Foreign Application Priority Data
Feb. 18, 2000 (JP) ........................................ 2000-040652

(51) Int. Cl.[7] .............................................. H04L 12/28
(52) U.S. Cl. ............................ 370/395.61; 370/395.6; 370/474
(58) Field of Search .............................. 370/236, 395.1, 370/395.6, 395.61, 395.65, 474

(56) References Cited

U.S. PATENT DOCUMENTS 5,742,600 A * 4/1998 Nishihara ................ 370/395.6
5,848,067 A * 12/1998 Osawa et al. ........... 370/395.61
6,061,820 A * 5/2000 Nakakita et al. ........ 370/395.65
6,134,245 A * 10/2000 Scarmalis ................ 370/474
6,157,614 A * 12/2000 Pasternak et al. ........... 370/236
6,442,163 B1 * 8/2002 Chopping ................... 370/474
6,667,978 B1 * 12/2003 Delp et al. ................ 370/395.1

FOREIGN PATENT DOCUMENTS

JP          09205434          8/1997

* cited by examiner

Primary Examiner—Salvatore Cangialosi
(74) Attorney, Agent, or Firm—Katten Muchin Zavis Rosenman

(57) ABSTRACT

A system for controlling a bandwidth when receiving and reassembling a consecutive data stream transferred while segmented by AAL1 format cells which enables correct determination of non-P and P formats and reassembly of cells even when error arises in multiple bits including the CSI bit of an AAL1 cell or when adding dummy cells and thereby enabling prevention of a gap in data in a frame, comprising, in a data reassembly unit which reassembles received cells, an 8-cell buffer for storing 8 cells of a cycle of a sequence count (SC) of 0 to 7 and sending the cells out to a later stage after a check unit of a sequence number (SN) field confirms normalcy of the cells and a control unit for control so that the number of P format cells stored in the 8-cell buffer becomes 1 cell when 8 cells are stored in the 8-cell buffer.

11 Claims, 21 Drawing Sheets

Fig.2

(1) CONTROL METHOD OF 8 CELL BUFFER

| a: SC | 0 | 1 | 2 | 3 | 4 | 5 | 6 | 7 |
|---|---|---|---|---|---|---|---|---|
| b: RECEIVED CSI | 0 | 0 | 0 | 0 | 0 | 0 | 0 | 0 |
| c: DECISION FORMAT | N | N | N | N | N | N | P | N |

(2) CONTROL METHOD OF 8 CELL BUFFER

| a: SC | 0 | 1 | 2 | 3 | 4 | 5 | 6 | 7 |
|---|---|---|---|---|---|---|---|---|
| b: RECEIVED CSI | 0 | 0 | 0 | 0 | 0 | 0 | 0 | 0 |
| d: DUMMY CELL | 0 | 0 | 1 | 1 | 1 | 0 | 0 | 0 |
| c: DECISION FORMAT | N | N | N | N | P | N | N | N |

(3) CONTROL METHOD OF 8 CELL BUFFER

| a: SC | 0 | 1 | 2 | 3 | 4 | 5 | 6 | 7 |
|---|---|---|---|---|---|---|---|---|
| b: RECEIVED CSI | 0 | 0 | 0 | 0 | 0 | 0 | 0 | 0 |
| e: INVALID CELL | 0 | 0 | 1 | 0 | 1 | 0 | 0 | 0 |
| c: DECISION FORMAT | N | N | N | N | P | N | N | N |

Fig.3 a: SC             0  1  2  3  4  5  6  7
b: RECEIVED CSI   0  0  0  0  0  0  0  0
d: DUMMY CELL     0  0  0  0  1  0  0  0
e: INVALID CELL   0  0  1  0  0  0  0  0 c: DECISION       N  N  N  N  P  N  N  N
   FORMAT
(4) CONTROL METHOD OF
    8 CELL BUFFER a: SC             0  1  2  3  4  5  6  7
b: RECEIVED CSI   0  0  0  0  1  1  0  0 c: DECISION       N  N  N  N  P  N  N  N
   FORMAT
(5) CONTROL METHOD OF
    8 CELL BUFFER a: SC             0  1  2  3  4  5  6  7
b: RECEIVED CSI   0  0  1  0  1  0  0  0 c: DECISION       N  N  N  N  P  N  N  N
   FORMAT
(6) CONTROL METHOD OF
    8 CELL BUFFER a: SC             0  1  2  3  4  5  6  7
b: RECEIVED CSI   0  0  1  0  1  0  0  0
e: INVALID CELL   0  0  1  0  0  0  0  0 c: DECISION       N  N  N  N  P  N  N  N
   FORMAT
(7) CONTROL METHOD OF
    8 CELL BUFFER

Fig.14

| SC | CSI | INVALID | FRAME COUNTER | P FORMAT HAS BEEN ADDED | DECISION PROCESSING | NOTE |
|---|---|---|---|---|---|---|
| | 1 | 0 | d.c | d.c. | P FORMAT IS MAINTAINED | *1 |
| | 1 | 1 | 1 | d.c. | P FORMAT IS MAINTAINED | *2 |
| 0,2,4 | 1 | 1 | 0 | d.c. | CHANGED TO NON-P FORMAT | *3 |
| | 0 | 0 | 1 | d.c. | CHANGED TO P FORMAT | *4 |
| | 0 | 0 | 0 | d.c. | NON-P FORMAT IS MAINTAINED | |
| | 0 | 1 | 1 | d.c. | CHANGED TO P FORMAT | *3 |
| | 0 | 1 | 0 | d.c. | NON-P FORMAT IS MAINTAINED | *2 |
| 1,3,5,7 | 0 | 0 | d.c | d.c. | NON-P FORMAT IS MAINTAINED | |
| | 1 | 0 | d.c | d.c. | ASSUMING AS CSI ERROR BAND IS COMPULSORILY ADJUSTED | |
| | d.c | d.c | d.c | 0 | P FORMAT IS MAINTAINED | *1 |
| 6 | 1 | 1 | 0 | 1 | P FORMAT IS MAINTAINED | *3 |
| | 0 | 0 | 0 | 1 | CHANGED TO NON-P FORMAT | |
| | 0 | 1 | 0 | 1 | NON-P FORMAT IS MAINTAINED | *2 |

*1 RECOGNIZED AS NORMAL POINTER
*2 ASSUMED AS MULTIPLE BIT ERROR INCLUDING CRC AND EP
*3 ASSUMED AS MULTIPLE BIT ERROR INCLUDING CSI AND EP
*4 ASSUMED AS DUMMY CELL

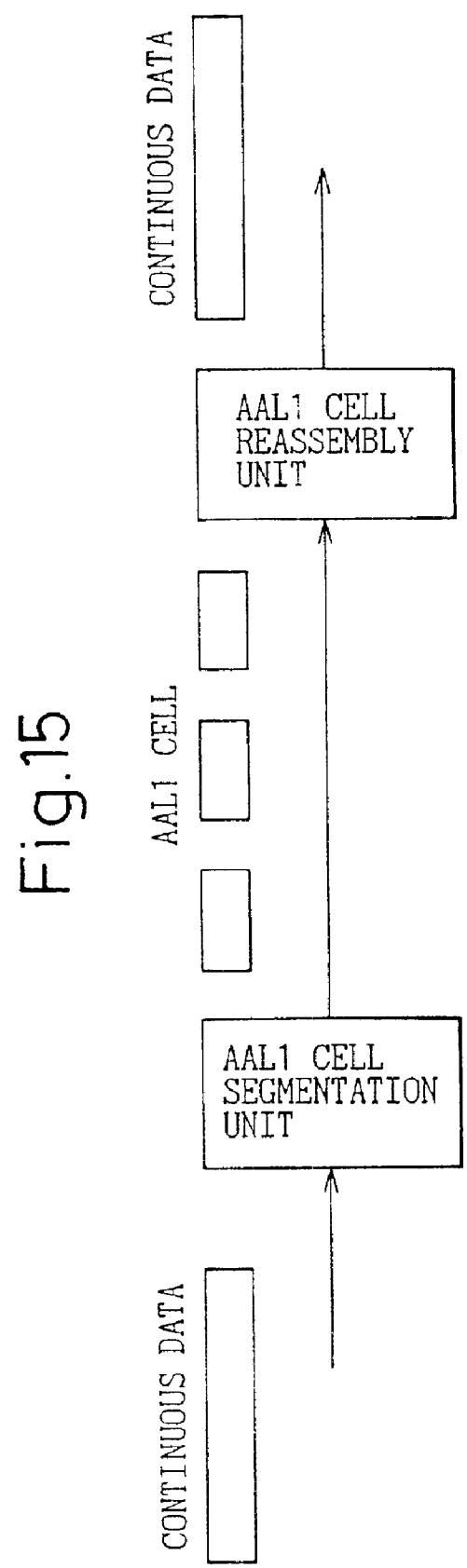

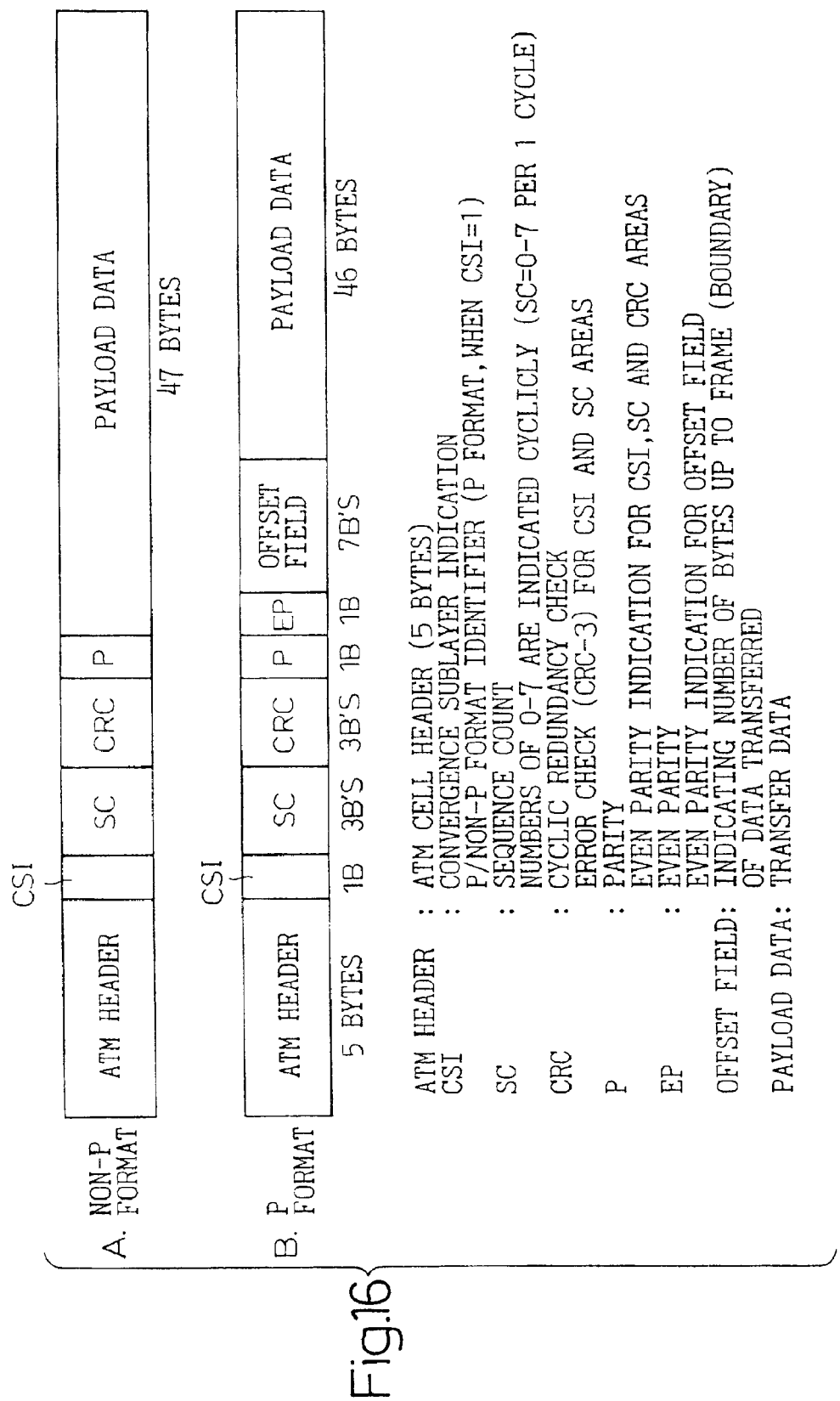

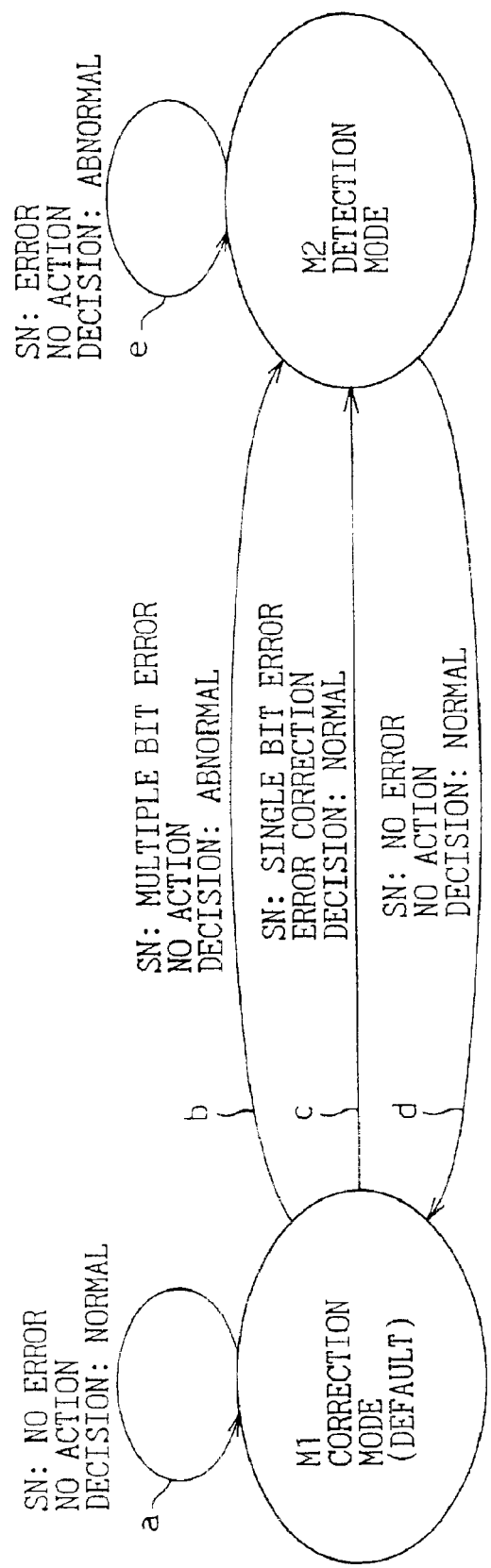

Fig.19

| | RESULT OF CRC-3 OPERATION | RESULT OF PARITY CHECK | STATE | MODE TRANSITION |
|---|---|---|---|---|
| DURING CORRECTION MODE | OK | OK | SN IS VALID | |
| | NG | NG | 1 BIT IS CORRECTED BY CRC-3 ERROR BIT DECISION AND SN IS VALID | TRANSITION TO DETECTION MODE |
| | OK | NG | CORRECTION BY PARITY BIT IS DONE AND SN IS VALID | TRANSITION TO DETECTION MODE |
| | NG | OK | CORRECTION CANNOT BE DONE DUE TO MULTIPLE BIT ERROR AND SN IS INVALID | TRANSITION TO DETECTION MODE |
| DURING DETECTION MODE | OK | OK | SN IS VALID | TRANSITION TO CORRECTION MODE |
| | NG | NG | NOT CORRECTED AND SN IS INVALID | |
| | OK | NG | NOT CORRECTED AND SN IS INVALID | |
| | NG | OK | NOT CORRECTED AND SN IS INVALID | |

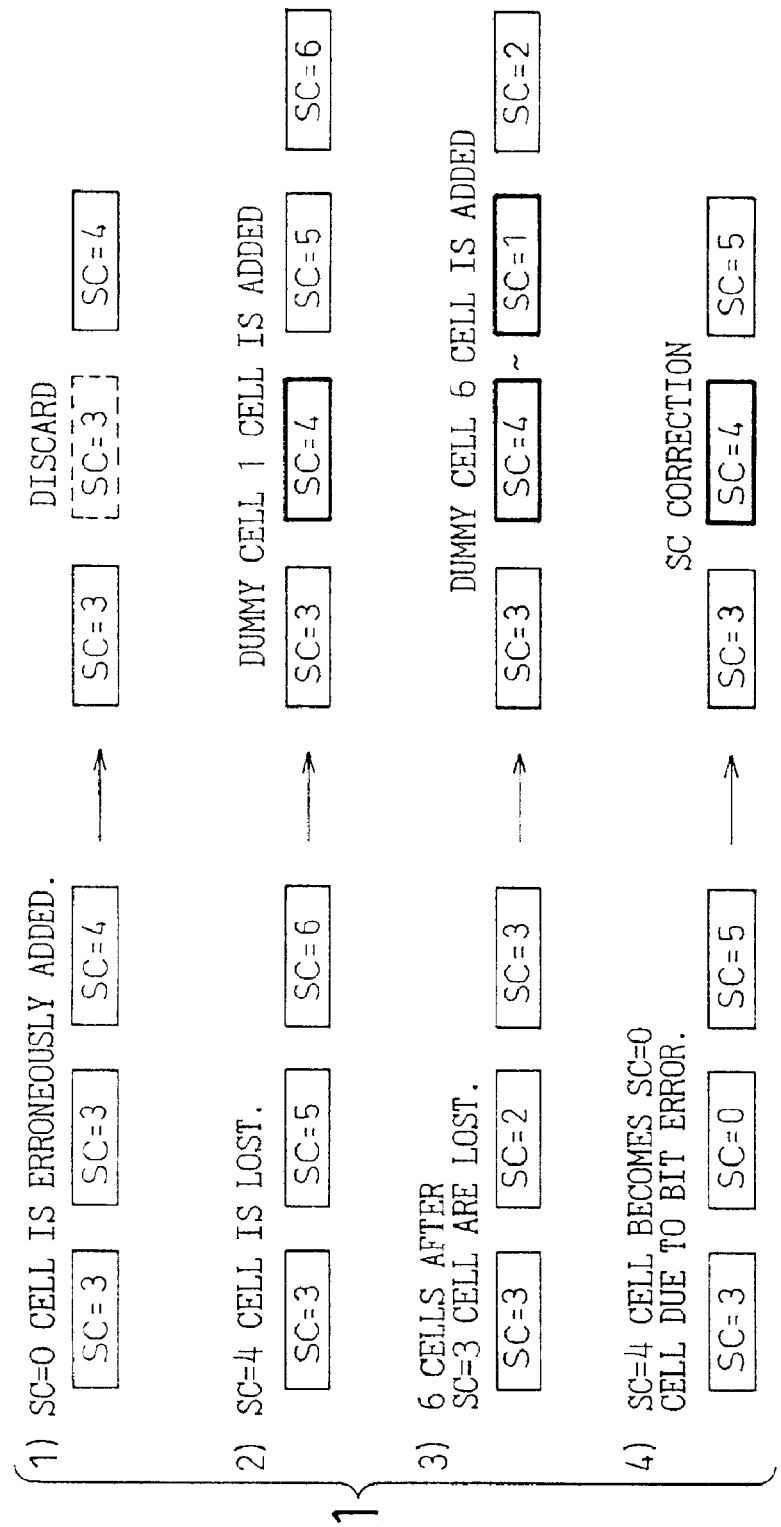

SYSTEM FOR CONTROLLING AAL1 CELL BANDWIDTH

BACKGROUND OF THE INVENTION

1. Field of the Invention

The present invention relates to a system for controlling adaptation layer 1 (AAL1) cell bandwidth in an asynchronous transfer mode (ATM).

In recent years, increasing use has been made of networks using ATM for providing broadband integrated service digital networks (BISDN).

Work on establishing standards for the ATM system is being performed at the International Telecommunications Union Telecommunication Sector (ITU-T). Protocol for the user network interface (UNI) (UNI protocol) has been recommended. In this recommendation, layers for open system interconnection (OSI) are defined. The ATM layer handles cell multiplexing and switching and defines the bearer capability of cells common for all applications. All information is transferred in cell units, so at the ATM layer handling the transfer of cells and lower layers, no processing is performed bearing in mind voice, data, video, and other media services. The quality of service required for each service (delay time, error rate, etc.) differs for each medium, however. Therefore, when converting the original information of the services into cells, an ATM adaptation layer (AAL) is provided for absorbing the differences in the quality conditions.

This AAL is comprised of a segmentation and reassembly sublayer (SAR) for segmenting information into cells and reassembling them and a convergence sublayer (CS) for guarantee against fluctuation of cells due to delay in accordance with the conditions required by the quality of service, restoration of the transmitting side clock frequency at the receiving side, error control for frames, and flow control. A number of types of AALs have been defined in accordance with the timing between the transmitting and receiving ends, the bit rate, and the parameters of the connection mode. Among them, AAL Type 1 (AAL1) specifications (e.g., format) have been defined for AAL Service Class A for providing a constant bit rate (CBR) such as voice or existing dedicated line services.

In AAL1, an SAR protocol data unit (SAR-PDU) to be added to an ATM header (5 bytes) is defined. An SAR-PDU is comprised of an SAR header (1 byte) and an SAR-PDU payload (47 bytes). A CS indication (CSI) bit is placed at the head of the SAR header. When transferring data by structured data transfer (SDT), that is, transfer of data having a frame structure such as 64 Kbps×n (n≧2), using the CSI bit, a pointer showing a boundary between frame data (lead position of frame) is set at the lead 1 byte of the SAR-PDU payload.

When transferring a consecutive data stream having such a frame structure converted into cells by the SDT mode of AAL1 (AAL Type 1 cells), if cells are discarded or erroneously added or there is bit error in the SAR header, the data rate between the transmitting and receiving ends becomes unstable. It is desirable to make improvements to stabilize this.

2. Description of the Related Art

As will be explained in detail later using the drawings, in an example of the related art, when only one cell is invalid, cells can be received by the reassembly buffer (RBUF). Further, when there is multiple bit error including the CSI bit or when using dummy cells to complement original P-format cells, the payload data of for example 46 bytes is reassembled into 47-byte data. By this, the data length thereof becomes different from the data length of the original data. Therefore, the data rates between the transmitting and receiving ends do not match and a gap arises in the data in a frame until a cell showing the next boundary (frame) arrives and therefore there is the problem that the frame format structure is lost.

SUMMARY OF THE INVENTION

An object of the present invention is to provide a system for controlling an AAL1 cell bandwidth enabling correct determination of non-P and P-formats and reassembly of cells even when error arises in multiple bits including the CSI bit of an AAL1 cell or when adding dummy cells and thereby enabling prevention of a gap in data in a frame.

To attain the above object, the present invention provides a system for controlling a bandwidth when receiving and reassembling a consecutive data stream transferred while segmented into AAL1 format cells, having, in a data reassembly unit which reassembles received cells, an 8-cell buffer for storing 8 cells of a cycle of a sequence count (SC) of 0 to 7 and sending the cells out to a later stage after a check unit of a sequence number (SN) field confirms normalcy of the cells and a control unit for control so that the number of P-format cells stored in the 8-cell buffer becomes 1 cell when 8 cells are stored in the 8-cell buffer.

BRIEF DESCRIPTION OF THE DRAWINGS

These and other objects and features of the present invention will become more apparent from the following description of the preferred embodiments given with reference to the attached drawings, in which:

FIG. 2 is part 1 of a view of the system for control by the first basic configuration according to the present invention;

FIG. 3 is part 2 of a view of the system for control by the first basic configuration according to the present invention;

FIG. 14 is a view of an example of the configuration of a table provided at a bandwidth adjusting unit;

FIG. 15 is a view explaining the AAL1 cell transfer method;

FIG. 16 is a view of the AAL1 cell format;

FIG. 18 is a state transition diagram at the time of receiving an AAL1 cell;

FIG. 19 is a view of the operation at the time of various state transitions;

FIG. 21 is a view of a method of correction of an error cell according to the related art.

DESCRIPTION OF THE PREFERRED EMBODIMENTS

Figure 1:
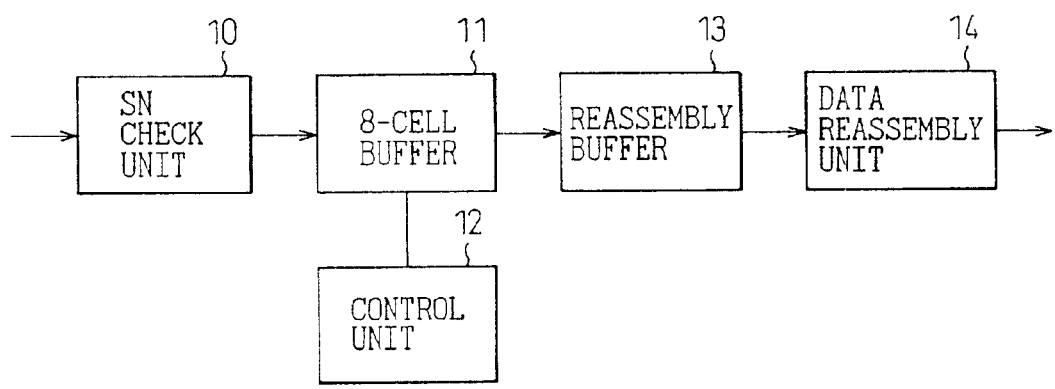
FIG. 1 is a view of a first basic configuration according to the present invention.

Before describing the embodiments of the present invention, the related art and the disadvantages therein will be described with reference to the related figures.

FIG. 15 is a view explaining the AAL1 cell transfer mode. Continuous data (for example, voice or dedicated line data) is segmented into cells of the AAL1 format by an AAL1 cell segmentation unit, transmitted through the ATM network, reassembled by an AAL1 cell reassembly unit provided at a network terminal of the other party to convert it to the original continuous data, then sent to the receiving side.

FIG. 16 shows the AAL1 cell formats. There are two formats A and B. AAL1, as explained above, defines an SAR-PDU to be added to the ATM header (5 bytes). An SAR header (1 byte) is provided at the head of this. The head 1 bit is an area showing the CSI. The next 3 bits form the area showing the numbers 0 to 7 cyclically by 3 bits in the order of transmission of the cells so as to indicate the sequence count (SC). The CSI and SC are referred to together as the sequence number (SN) field. The following 4 bits are called the SN protection (SNP) field for error checks of the SN field and are comprised of the 3-bit cyclic redundancy check (CRC-3) and the subsequent 1-bit even parity (shown by P) for the CSI, SC, and CRC. Error detection of the SAR header and 1-bit error correction are realized by this SNP field.

The CSI bit in the SAR header indicates if an offset field indicating a boundary position of structured data (area for setting a number indicating at which byte from the head of the payload data (transfer data) a boundary of data is located) is included after the SAR header. That is, "A" in FIG. 16 shows the case where the CSI bit is "0". In this case, no pointer is included and 47 bytes' worth of payload data is stored after the SAR header. This is called the "non-P format".

"B" in FIG. 16 shows the case where the CSI bit is "1". This shows that the cell includes an offset field (8-bit field including pointer). This is called the "P-format". In the P-format, 1 byte' worth of an offset field is added after the SAR header. The lead bit (shown by EP) in this 1 byte is the even parity for checking the offset (pointer) field, while the following 7 bits are the offset (pointer). This offset (pointer) shows the number of bytes until a frame (boundary) of data to be transferred (number from 0 to 93 showing the byte position until the payload of the cell following that cell, that is, number showing the boundary position). In the case of the P format, the payload data is 46 bytes.

Figure 17:
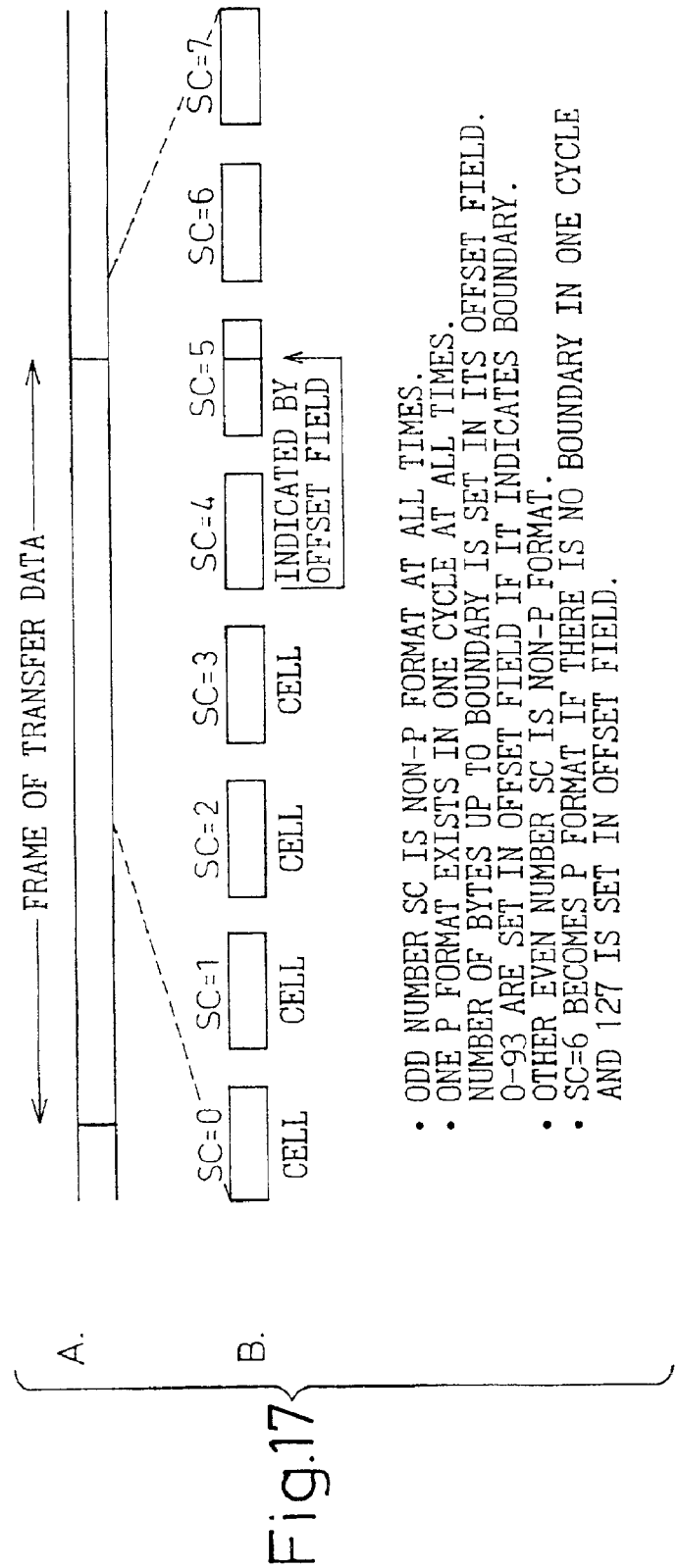
FIG. 17 is a view explaining the configuration of a cell for transferring structured data.

FIG. 17 is a view explaining the configuration of a cell for transferring structured data.

"A" in FIG. 17 shows structured continuous transfer data. Each frame is configured as shown in "A". When transferring data segmented into ATM cells, the data is divided into payloads of many cells as shown in "B" and stored for transfer. "B" of FIG. 17 shows only 8 cells as part of the cells. These are generated in the order of the sequence count (SC) 0 to 7 in the SAR header explained with reference to FIG. 16 to form one cycle. Here, the specifications of the SC will be explained. When the SC is odd, the cell is always of a non-P format (not including pointer) and the CSI bit is set to "0". There is always one P-format (even number SC) cell in a cycle of cells of a SC=0 to 7. At this time, the CSI bit is set to "1". Offset information is set in this cell. The other even number SC cells of the cycle are of the non-P format. Further, when there is no boundary in one cycle (for example, when transferring long data such as data of several kilobytes), the cell of the SC=6 is made the P-format and the offset field (7 bits) is set to all "1" (number 127) to indicate there is no boundary in the cycle.

In the example of "B" of FIG. 17, the case is shown where the AAL1 cell of the SC=4 includes offset information and the position of the boundary of the data (boundary of frame) is designated in the payload of the AAL1 cell of SC=5 by the offset field.

In this way, the transmitting side sets the SC cyclically and sets the boundaries of the structured data, while the receiving side checks the continuity of the SN count to check for the loss or erroneous addition of ATM cells and discriminates the boundaries of the data.

FIG. 18 is a state transition diagram when receiving an AAL1 cell, while FIG. 19 is a view of the operation at the time of a state transition.

The receiving side of the AAL1 cell checks the SAR header (1 byte) explained in FIG. 16, checks for error in the CSI area and SC area by operation of the 3-bit CRC-3, and checks the parity bit (shown by P) for the CSI area, SC area, and CRC area and therefore can detect error and correct 1-bit error.

M1 in FIG. 18 is a correction mode of a normal mode of the receiving side. In this mode M1, if no error is detected by operation of the CRC-3 (when result of operation is OK) and the result of the parity check is good (OK), the SN is valid as shown in the topmost part of FIG. 19, there is no action as shown in "a" of FIG. 18, the cell is decided to be normal with no error, and the state does not change. At the time of the correction mode M1, when the result of computation of the CRC-3 is no good (shown by NG) and the result of the parity check is also NG, as shown in the second state of FIG. 19, 1-bit error correction in the CSI, SC, and CRC fields is performed to make the cell one with a valid SN. The mode however shifts to the detection mode shown by M2. This shift operation is shown by the line c in FIG. 18. Further, the case where the CRC-3 is OK and the result of the parity check is NG is shown in the third row of FIG. 19. In this case, the parity bit is corrected, the cell is decided to be one with a valid SN, and the state is shifted to the detection mode M2. This shift operation is shown by c of FIG. 18. Further, the case in the correction mode M1 where the CRC-3 is NG and the parity check is OK is shown by the fourth row in FIG. 19. In this case, since there is multiple bit error, correction is not possible, the cell is decided to be one with an invalid SN, and the detection mode M2 is shifted to. This shift operation is shown by b of FIG. 18.

In the detection mode M2, as shown from the sixth to eighth rows of FIG. 19, if the result of one of the CRC-3 operation and parity check is NG, the cell is decided to be one with bit error, no correction is performed, and the cell is decided to be one with an invalid SN (shown by e in FIG. 18). When both are OK, the cell is decided to be one with a valid SN and the correction mode M1 is returned to (shown by d in FIG. 18).

Figure 20:
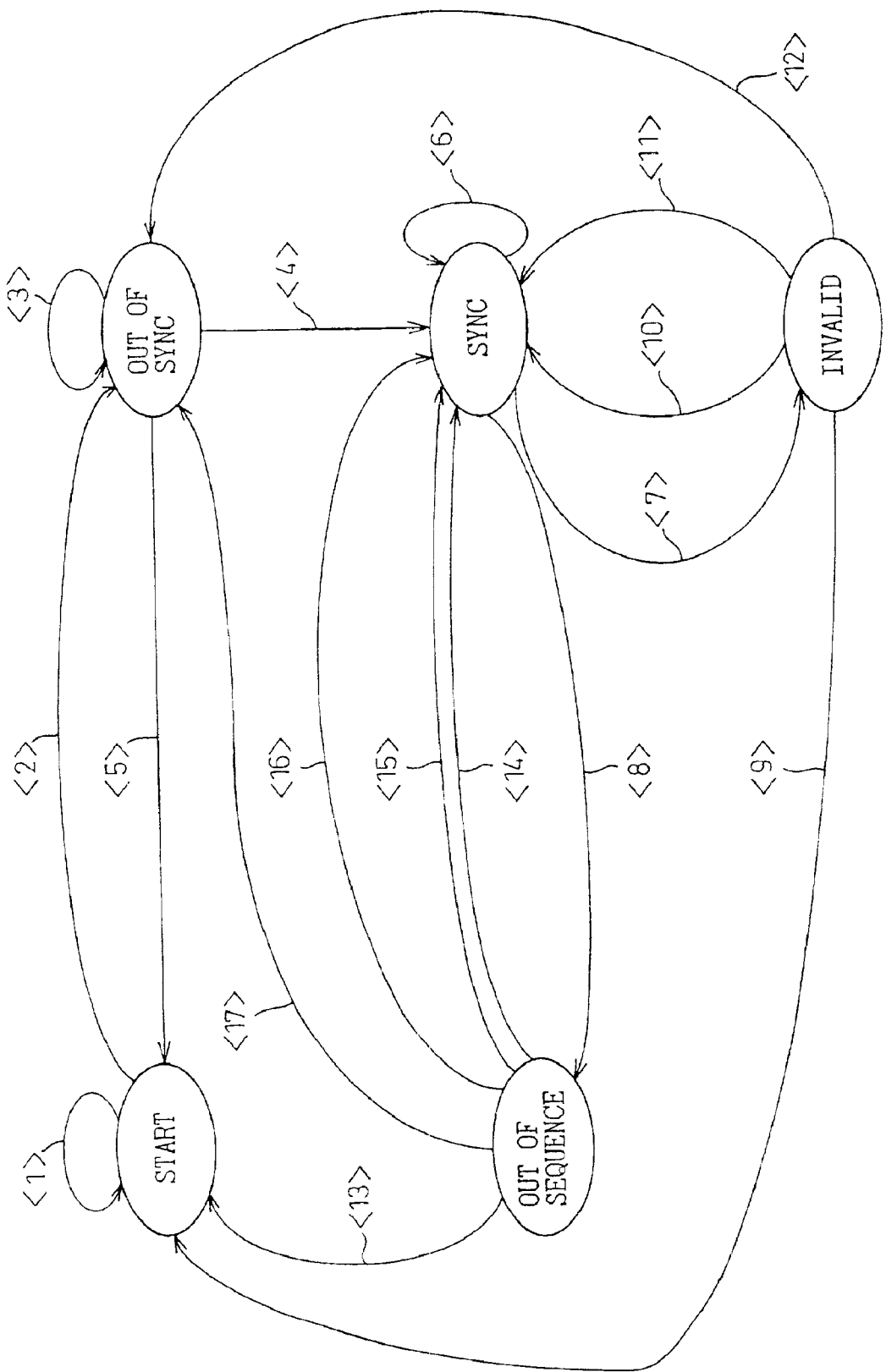
FIG. 20 is a view of a robust SN algorithm.

In this way, in the AAL1 cell transfer system, numbers 0 to 7 are imparted sequentially to the cells. Based on the continuity of the SC of a received cell with a previously received cell, it is possible to make the number of ATM cells match and achieve synchronization between the transmitting and receiving ends by insertion of dummy cells (cells of SAR-PDU header of all "1" other than CSI bit and payload of all "1") or discarding of erroneously added cells to deal with loss or erroneous addition of up to six cells at the receiving side. To realize such an operation, a robust SN algorithm is recommended as ITU-T Recommendation I.363.1. This algorithm is shown in FIG. 20.

The algorithm shown in FIG. 20 may be explained as follows using the numerals 1 to 17 showing the state transitions in the figure.

(a) Start: In the initial state, the cells are discarded until a cell having a valid SN arrives.

<1> When a cell having an invalid SN arrives, the momentarily stored cells are discarded.

<2> When a cell having a valid SN arrives, the momentarily stored cells are discarded and the "out of sync" state is shifted to.

(b) Out of sync: In this state, the sequence counts are still not synchronized. The arrival of an SC consecutive with a previous SC is awaited.

<3> When there is no consecutive SC, the momentarily stored cells are discarded.

<4> When a consecutive SC arrives, the momentarily stored cells are written in a reassembly buffer (RBUF) and the sync state is shifted to.

<5> When a cell with an invalid SN arrives, the momentarily stored cells are discarded and the start state is returned to.

(c) Sync: In this state, the sequence counts are synchronized.

<6> When an SC is consecutive with a preceding SC, the momentarily stored cells are written into the RBUF.

<7> When the SN is invalid, the momentarily stored cells are written in the RBUF and the system shifts to the invalid state.

<8> When an SC is not consecutive with the preceding SC, the momentarily stored cells are written in the RBUF and the system shifts to the out of sequence state.

(d) Invalid: In this state, the system makes decision with respect to the momentarily stored cells having an invalid SN when that cell arrives.

<9> When the SN of the arriving cell is again invalid, the system shifts to the start state and the momentarily stored cells are discarded.

<10> When the SN of the arriving cell is valid and the SC is consecutive with the last arriving cell having a valid SN, the system returns to the sync state, but the momentarily stored cells are considered to have been erroneously added and are discarded.

<11> When the SN of the arriving cell is valid, but the SC is advanced by two from the last arriving SC having a valid SN, there is an invalid SN, but it is assumed that the momentarily stored cells are consecutive, the cells are accepted, and the system returns to the sync state.

<12> When the SN of the arriving cell is valid, but in cases other than the above, the momentarily stored cells are discarded and the system shifts to the out of sync state.

(e) Out of sequence: In this state, the following operation is performed when a cell arrives.

<13> When the SN of the arriving cell is invalid, the momentarily stored cells are discarded and system shifts to the start state.

<14> When the SN of the arriving cell is valid and the SC is consecutive with the last cell arriving before the momentarily stored cells, the momentarily stored cells are considered to have been erroneously added and are discarded and the system returns to the sync state.

<15> In a case other than the above <14>, when the SN of the arriving cell is valid and the SC is consecutive with the SC of the momentarily stored cells, it is assumed that a plurality of cells were lost, a number of dummy cells equal to the number of lost cells are added, the momentarily stored cells are written into the RBUF, and the system returns to the sync state.

<16> When the SN of the arriving cell is valid and the SC is advanced by two from the SC of the last cell arriving before the momentarily stored cells, it is assumed that the momentarily stored cells are consecutive (that is, it is considered that the SN error protection mechanism malfunctioned), a correct SC is attached, the momentarily stored cells are written in the RBUF (reassembly buffer), and the system returns to the sync state.

<17> When the SN of the arriving cell is valid, but the case is other than the above, the momentarily stored cells are discarded and the system shifts to the out of sync state.

FIG. 21 shows a method of correction of an error cell of the related art. When the cells shown at the left half are received, correction is performed as shown in the right half shown by the arrow. The principle used is the robust SN algorithm shown in FIG. 20.

1) of FIG. 21 is an example where two consecutive cells of the same sequence count (SC=3) are received. In this case, it is assumed that the second cell with the SC=3 was erroneously added and this is discarded, thereby making the SC sequential. 2) of FIG. 21 is an example where an SC has been lost. To correct this, a dummy cell of SC=4 is added after the cell of SC=3. Note that the dummy cell is unconditionally a non-P format. 3) of FIG. 21 is an example where a cell of SC=2 has been received after a cell of SC=3. It is assumed that six cells have been lost. To correct this, six dummy cells (cells of SC=4 to SC=1) are added. 4) of FIG. 21 is an example where cells of SC=0 and SC=5 are received after a cell of SC=3. It is assumed that a bit error arose in the cell of SC=0 and the cell of SC=0 is corrected to a cell of SC=4.

As already explained in the description of the related art, in the above method of the related art, as shown by state <11> of FIG. 20, when only one cell is invalid, cells can be received by the reassembly buffer (RBUF). Further, when there is multiple bit error including the CSI bit or when using dummy cells to complement cells of the original P-format, the payload data of for example 46 bytes is reassembled into 47-byte data. By this, the data length thereof becomes different from the data length of the original data. Therefore, the length of the data no longer matches with that of the original data, the data rates between the transmitting and receiving ends do not match, and a gap arises in the data in a frame until a cell showing the next boundary (frame) arrives and therefore there is the problem that the frame format structure is lost.

The present invention provides a system for controlling an AAL1 cell bandwidth enabling correct determination of the non-P and P-formats and reassembly of cells even when error arises in multiple bits including the CSI bit of an AAL1 cell or when adding dummy cells and thereby enabling prevention of a gap in data in a frame.

Figure 4:
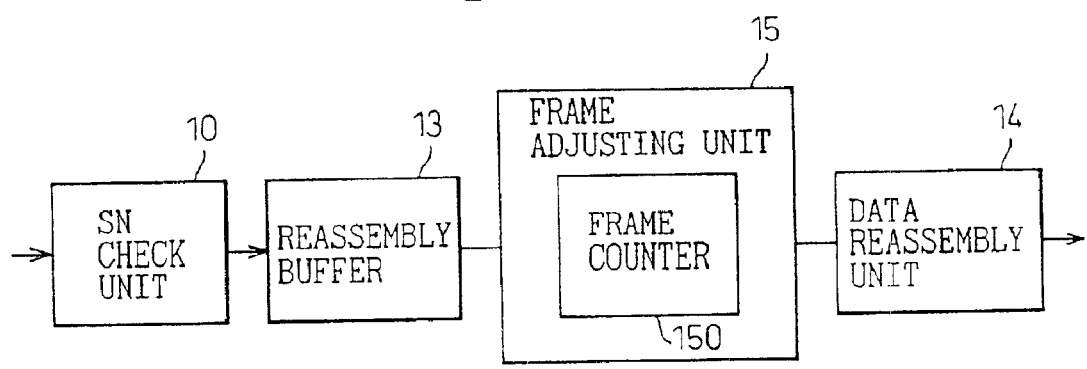
FIG. 4 is a view of a second basic configuration according to the present invention.
Figure 5:
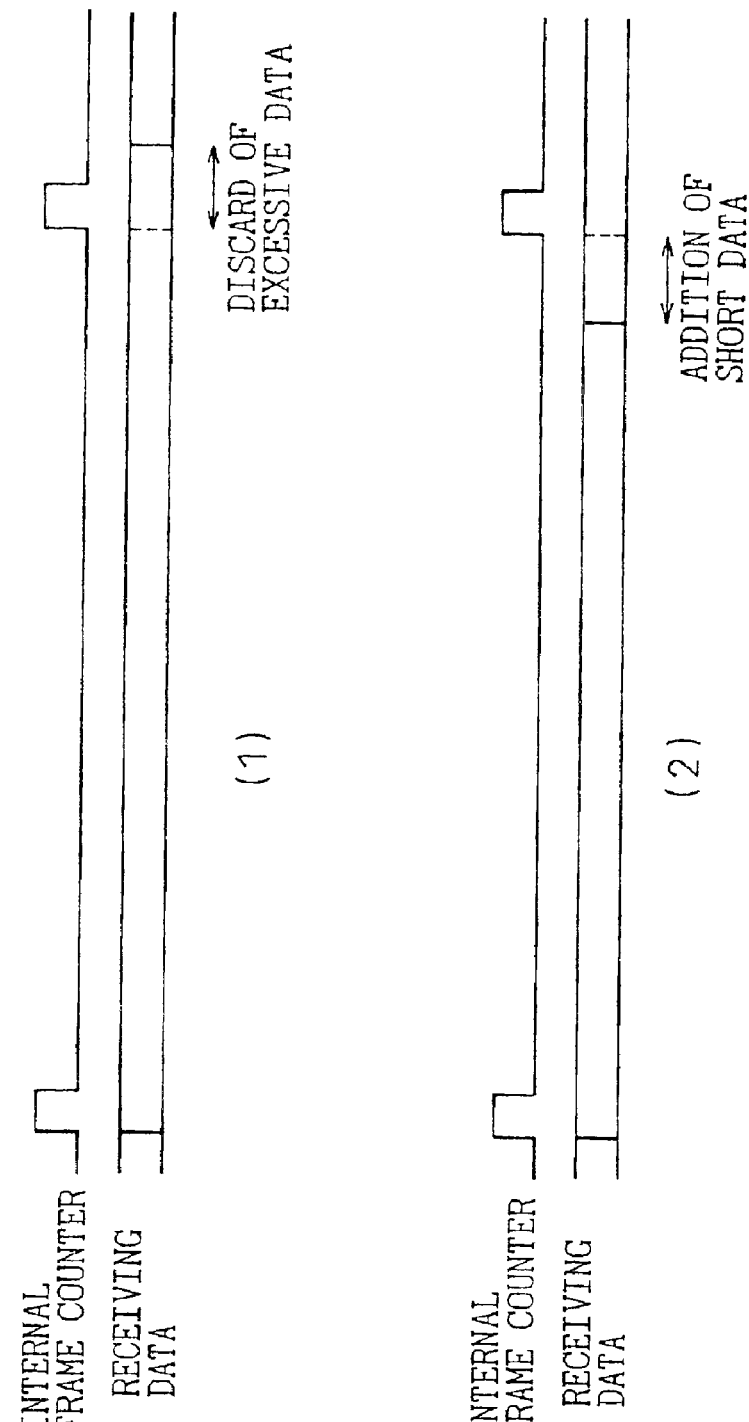
FIG. 5 is a view of the system for control by the second basic configuration according to the present invention.
Figure 6:
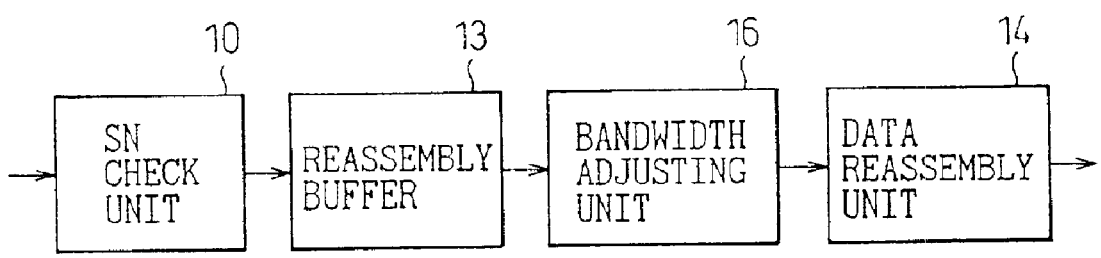
FIG. 6 is a view of a third basic configuration according to the present invention.

FIG. 1 is a view of a first basic configuration according to the present invention. FIG. 2 and FIG. 3 are parts 1 and 2 of a view of the system for control by the first basic configuration according to the present invention. FIG. 4 is a view of a second basic configuration according to the present invention. FIG. 5 is a view of the system for control by the second basic configuration according to the present invention. Further, FIG. 6 is a view of a third basic configuration according to the present invention.

In FIG. 1, reference numerals 10 to 13 show the block configuration of key parts on the side receiving the AAL1 cells. Reference numeral 10 is an SAR header sequence number (SN) check unit, 11 is a 8-cell buffer for storing eight cells corresponding to one cycle of the sequence count (SC), 12 is a control unit for judging the P-format of the cells stored in the 8-cell buffer and controlling the bandwidth, 13 is a reassembly buffer for storing received cells minus the headers etc. of the ATC cells to absorb fluctuation of the received cells, and 14 is a data reassembly unit for detecting the boundaries of consecutive data to generate the original frames and reassembling the consecutive data. Note that the 8-cell buffer 11 may be changed to be provided between the reassembly buffer 13 and the data reassembly unit 14 instead of being provided at the position shown in FIG. 1. The operation in this case is similar to that of FIG. 1.

The method of control of reassembly according to the configuration of FIG. 1 will be explained with reference to FIG. 2. Note that FIG. 2 and FIG. 3 show examples (1) to (7). The "a" in FIG. 2 indicates the sequence count (SC), "b" the receiving convergence sublayer indication (CSI), "c" the decision format showing the result of the control of format according to the present invention, "d" the distribution of the dummy cells, and "e" the distribution of the invalid cells.

AAL1 ATM cells are received, the sequence counts of the SAR headers are checked by the SN check unit 10, and eight cells of one cycle of the correct sequence counts (SC) 0 to 7 are momentarily stored successively in the 8-cell buffer 11. When the eight cells are stored in the buffer, the CSI bit in the 8-cell buffer is referred to and the number of P-format cells is adjusted to one per cycle. In this case, the control unit 12 discriminates the content of the eight cells stored and performs the adjustments as shown in the examples shown in FIGS. 2 and 3.

First, in the case of (1) of FIG. 2, as shown by "a", when eight cells of SC=0 to 7 are stored in the 8-cell buffer 11, it is discriminated that, as shown by "b", the received CSI bits are all "0" and there is not even one P-format cell. In this case, it is understood that multiple bit error or cell loss in the middle of the relay lines has occurred in the P-format cells having the received CSI bit of "1" and that dummy cells have been added. If left in this state, the format would be violated. Therefore, since the P-format (offset value=127 set for SC=6) which is set when there is no boundary in one cycle (when the length of data is long) is the highest in probability, and thus, as shown in "c" of (1) of FIG. 2, the cell of SC=6 is unconditionally set to the P-format, the CSI bit of the cell of SC=6 is set to "1", the offset value=127 is set in the lead byte of the payload, and then the frames are reproduced at the receiving side to match the rates between the transmitting and receiving ends.

Next, in the case of (2) of FIG. 2, when there is not even one P-format cell in the eight cells in the 8-cell buffer 11 as shown in "b" and there are a plurality of dummy cells (in this example, three, that is, cells of SC=2, 3, and 4) as shown in "c", by setting the dummy cell having the largest SC as a P-format, it is possible to make the rates match between the transmitting and receiving ends. Note that in this example, the probability of the P-format (offset value=127 for cell of SC=6) which is set when no boundary is shown in one cycle is the highest, but conversely since the data rate does not change even if the cell having the smallest sequence count is made the P-format, this is also possible. (3) of FIG. 2 shows the case when there is not even one P-format cell in the eight cells in the 8-cell buffer 11 as shown in "b" and there are a plurality of cells with invalid SN (cells when there is an error in multiple bits) as shown in "e" (in this example, two, that is, cells of SC=2 and 4). In this case, the invalid cell with the largest sequence count is set as the P-format cell to match the data rates.

(4) of FIG. 3 is the case when there are eight cells of SC=0 to 7 stored in the 8-cell buffer 11 as shown in "a", the received CSI bits are all "0" (see "b" of (4)), and a dummy cell and an invalid cell are included (see "d" and "e" of same). In this case, the cell with the largest sequence count among the dummy cell or invalid cell is treated as a P-format cell so as to make the data rates match between the transmitting and receiving ends. (5) of FIG. 3 is the case when there are plurality of P-format cells (cells of CSI=1 and SC=4 and 5) in the cells stored in the 8-cell buffer 11. In this case, since sequence counts of P-format cells are only even counts, the odd number cells are processed unconditionally as non-P format cells to match the rates between the transmitting and receiving ends.

(6) of FIG. 3 is the case where there are a plurality of P-format cells (two cells of CSI=1 are SC=2 and 4) in the cells stored in the 8-cell buffer 11. In this case, the rates are matched between the transmitting and receiving ends by setting the cells other than the cell with the largest even number sequence count among them as non-P format cells. Further, in (7) of FIG. 3, when there are a plurality of P-format cells stored in the 8-cell buffer 11, the rates are made to match between the transmitting and receiving ends by setting the invalid cells among them as the non-P format.

In addition to the methods shown in the different cases of (1) to (7) shown in FIG. 2 and FIG. 3, it is also possible to perform processing by the same concept by combining these methods. Further, when there is a P-format cell showing a boundary under the concept of the present invention, sometimes the wrong cell position ends up being made a P-format. The phase deviation between a frame and data can however be kept to within one cycle, so the effect can be kept to a minimum.

FIG. 4 is a view of a second basic configuration according to the present invention; while FIG. 5 is a view of the system for control by the second basic configuration according to the present invention. In FIG. 4, reference numerals 10, 13, and 14, in the same way as FIG. 1, indicate a sequence number (SN) check unit, reassembly buffer, and data reassembly unit, while 15 indicates a frame adjusting unit including a frame counter 150.

The action of the second basic configuration shown in FIG. 4 will be explained next using FIG. 5. When transmitting a consecutive data stream having a frame structure using cells of an SDT format of the AAL1, the SN check unit 10 of the reassembly unit shown in FIG. 4 confirms the normalcy of the sequence count of the SAR header, then the reassembly buffer 13 stores the cell. At this time, the internal frame counter 150 which is synchronized in frame phase using the boundary position set in the pointer field following the SN field and the SNP field of the SAR header of the received cell and runs by itself to monitor the number of bytes in the frame of the received data. At this time, the receiving end side knows the frame length in advance and it monitors the frame length from a position showing the boundary of the frame arriving previously. When a position showing the next boundary does not arrive at the position corresponding to the period of the internal frame counter 150 (position where counter reaches full cycle) and more bytes are received, it is assumed that data has been erroneously added and discards the excessive data to adjust the data rate between the transmitting and receiving ends.

Further, as shown in (2) of FIG. 5, the internal frame counter 150 synchronized in frame phase by the boundary position set in the pointer field runs by itself to monitor the number of bytes in the frame of the received data. When receiving a number of bytes less than the period of the internal frame counter (when cells have been dropped and are short), the receiving end side compensates for the short data by dummy data to adjust the data between the transmitting and receiving ends. This can be carried out by combining controls of (1) and (2) in FIG. 5. Note that if the CSI bit is mistaken in the middle of the frame, the received data end up shifting until the next frame position, but this shift can be dealt with by combination with the first basic configuration of the present invention.

FIG. 6 shows the third basic configuration of the present invention. In the figure, the parts shown by reference numerals 10, 13, and 14 are the same as the parts of the same reference numerals in FIG. 1. That is, 10 is an SN check unit, 13 a reassembly buffer, and 14 a data reassembly unit. Reference numeral 16 shows a bandwidth adjusting unit. This third basic configuration differs from FIG. 1 in the point of the provision of the bandwidth adjusting unit 16 between the reassembly buffer 13 and the data reassembly unit 14.

In the third basic configuration, when the consecutive data stream having the frame structure is transmitted using cells of the SDT format of the AAL1, the SN check unit 10 of FIG. 6 confirms the normalcy of the sequence count of the SAR header, then the reassembly buffer 13 stores the cell. At this time, after the SN check of the cell, the CSI bit, SC number, cell with an invalid SN, condition of the internal frame counter synchronized in frame phase by the boundary position written in the pointer field, and condition of if a P-format cell already exists between the cell of SC=0 and the currently received cell are judged and the data rate between the transmitting end and receiving end is adjusted by referring to and detecting a table etc. corresponding to combinations of the conditions.

Figure 7:
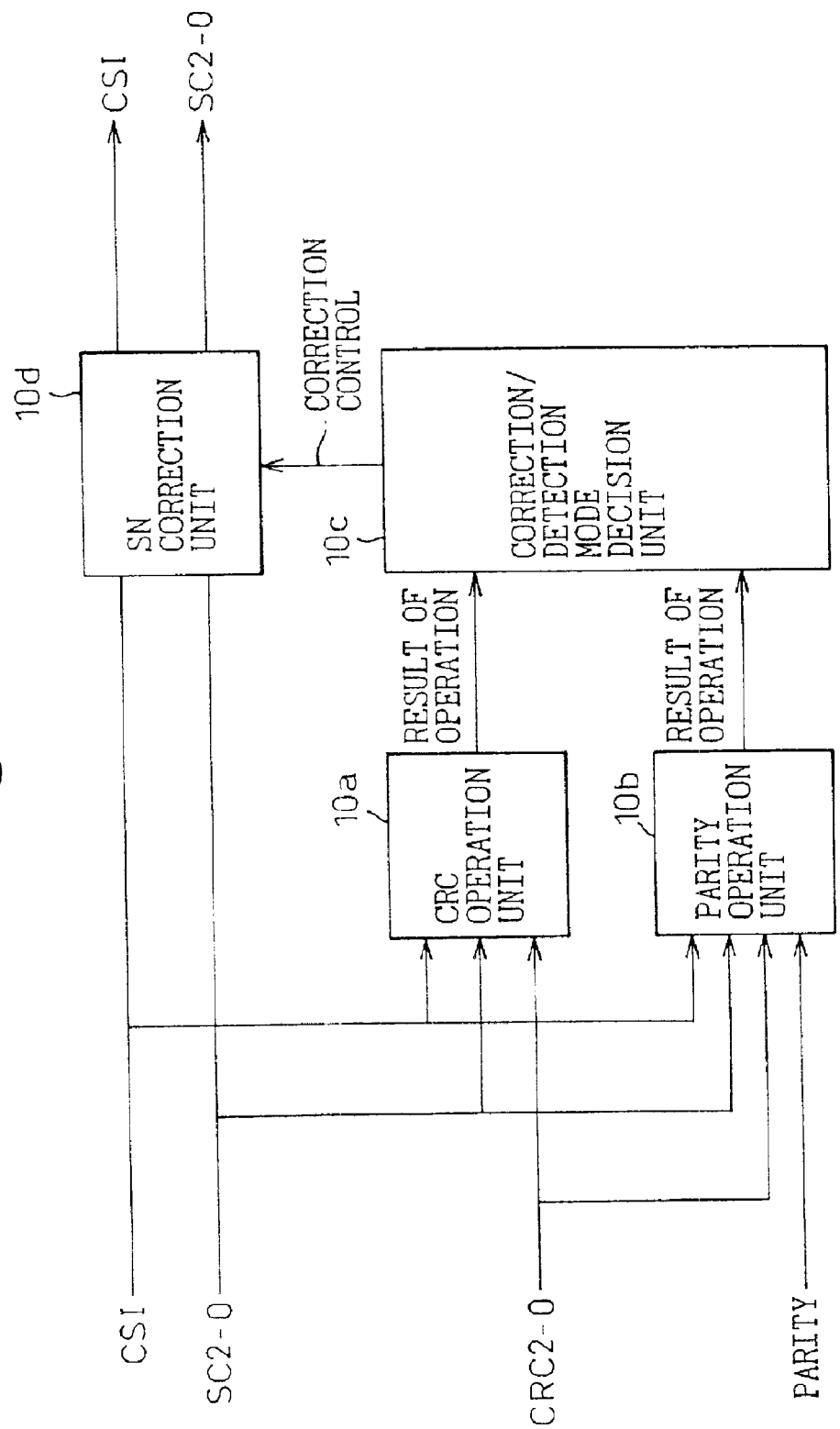
FIG. 7 is part 1 of a view of the configuration of an embodiment of an SN check unit.
Figure 8:
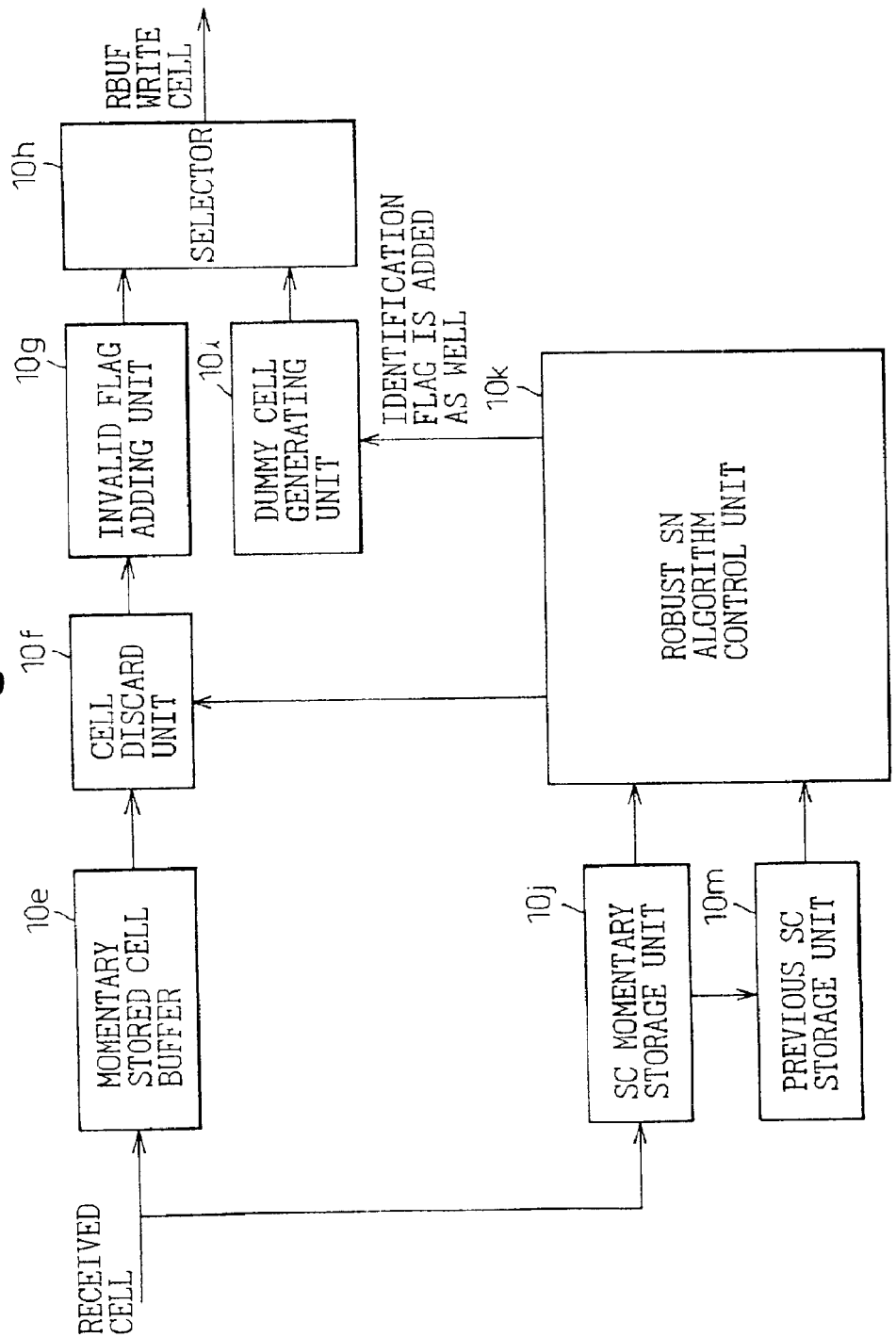
FIG. 8 is part 2 of a view of the configuration of an embodiment of an SN check unit.

FIG. 7 and FIG. 8 are first and second parts of views of the configuration of an embodiment of an SN check unit and give a specific example of the configuration of the SN check unit 10 described in the first to third basic configurations of the present invention (FIG. 1, FIG. 4, and FIG. 6).

FIG. 7 is a view of the configuration for checking an SN field. In FIG. 7, reference numeral 10a is CRC operation unit, 10b a parity operation unit, 10c a correction/detection mode decision unit, and 10d an SN correction unit.

In FIG. 7, an AAL1 cell is received at a reception unit (not shown) and the SAR header (1 byte) is detected. The CSI (1 bit) and SC (3 bits, shown by SC2-0) both comprising the SN field and the CRC (3 bits, shown by CRC2-0) and parity (1 bit) both comprising the SNP field, in the above 1 byte, are input to the respective units. The CRC operation unit 10a performs a CRC operation on the CSI, SC, and CRC and outputs the result of the operation to the correction/detection mode decision unit 10c. The parity operation unit 10b receives as input the CSI, SC2-0, CRC2-0, and parity bit, checks the even number parity, compares this with the received parity, and outputs the result of the operation, that is, correct or error, to the correction/detection mode decision unit 10c.

The correction/detection mode decision unit 10c uses the above two results of operations to perform a check in the correction mode state or the detection mode state as shown in FIG. 18 and FIG. 19 and shifts in mode. In the case of correction, it outputs the output of the correction control to the SN correction unit 10d and corrects 1-bit error in the 4 bits (CSI+SC2-0) comprising the SN field. The corrected CSI (1 bit) and S2-0 (3 bits) are supplied to the blocks of FIG. 8 explained next. Further, if it is decided that the SN is invalid such as when the result of the CRC operation unit 10a is NG and the results of the parity operation unit 10b are both OK, an output indicating invalidity is generated together with the SC2-0 (not shown in FIG. 7) and is supplied to the blocks of the later explained FIG. 8.

FIG. 8 shows the configuration of an embodiment of the synchronization control by a robust SN algorithm included in the SN check unit. The content of the algorithm is shown in FIG. 20. In FIG. 8, reference numeral 10e shows a momentary stored cell buffer, 10f a cell discard unit, 10g an invalid flag adding unit, 10h a selector, 10i a dummy cell generating unit, 10j an SC momentary storage unit for storing the currently received SC, 10k a robust SN algorithm control unit, and 10m a previous SC storage unit for storing an SC of a cell previously received (the SC of the previously received cell is written in the reassembly buffer).

In the configuration shown in FIG. 8, the CSI and SC2-0 are checked and confirmed to be correct by the configuration of FIG. 4 or else a cell containing content corrected for error (1 bit) is input and stored in the momentarily stored cell buffer 10e. On the other hand, the SC (sequence count) is stored in the SC momentary storage unit 10j, while the SC of the previously received cell is stored in the previous SC storage unit 10m. The robust SN algorithm control unit 10k receives as input the current SC from the SC momentary storage unit 10j. When the previous SC is input from the previous SC storage unit 10m, the cells are controlled by the algorithm explained with reference to FIG. 20.

When the SN check in FIG. 4 indicates that the SN is invalid, the cell discard unit 10f of FIG. 8 is activated and the cells of the momentary stored cell buffer 10e are discarded (<1>, <2>, <3>, <5>, <10>, <11> ... of robust SN algorithm in case of FIG. 20). Further, when the SN of the cell is valid, but the SC is advanced by two from the SC of the last arriving cell having the valid SN such as in the case shown in <11> of (d) in the explanation regarding the robust SN algorithm (FIG. 20), there is an invalid SN, but the momentary stored cells are accepted assuming them to be consecutive. However, the invalid flag adding unit 10g is activated and a flag indicating invalidity is added to the cell (specific bit in header). The flag in this case shows a signal indicating the invalid flag by separate signal lines for respective cells, or an invalid flag is set using a suitable bit in the header. Further, when it is necessary to add dummy cells such as in the case of <15> of the robust SN algorithm of FIG. 20, the dummy cell generating unit 10i is activated and a necessary number of dummy cells are generated.

Note that the dummy cell is for example a cell where the SAR-PDU is set to all "1" other than the CSI=0 and the payload data is set to all "1". Further, for the first basic configuration (FIG. 1), an identification flag indicating the dummy cell is added to the header. The selector 10h selects one of the cells from the momentary stored cell buffer 10e (including normal cells and cells flagged as invalid) and the dummy cells from the dummy cell generating unit 10i. Its output is supplied to the 8-cell buffer in the case of the first basic configuration and is supplied to the reassembly buffer in the case of the second or third basic configuration.

Figure 9:
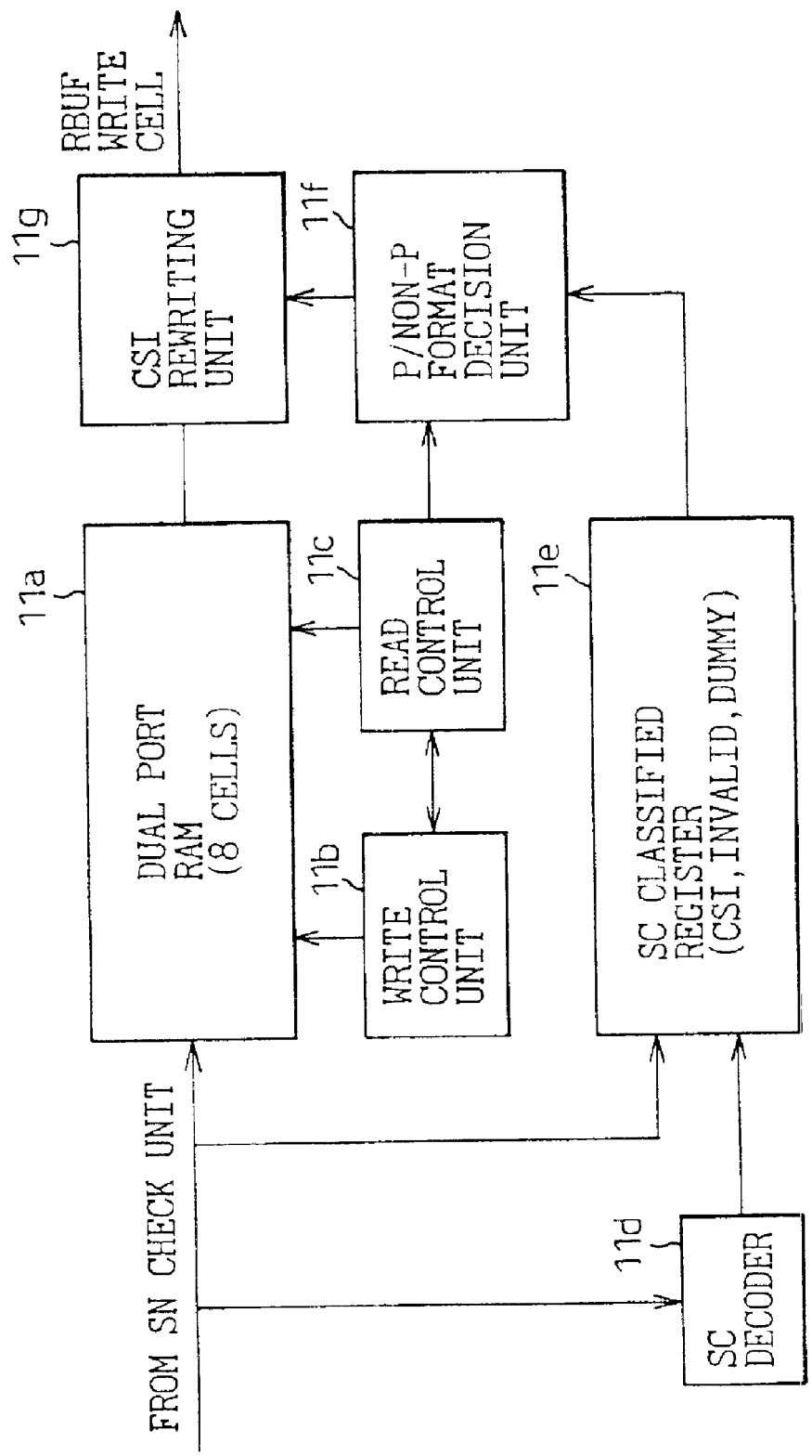
FIG. 9 is a view of the configuration of an embodiment of an 8-cell buffer.

FIG. 9 is a view of the configuration of an embodiment of an 8-cell buffer and shows a specific example of the configuration of the 8-cell buffer 11 of the first basic configuration (FIG. 1) of the present invention.

In FIG. 9, reference numeral 11a indicates a dual port RAM able to simultaneously write and read data, 11b is a write control unit, 11c a read control unit, 11d a SC decoder, 11e an SC classified register able to store CSI bits, invalid SN flags, dummy cell discrimination flags, etc. corresponding to the values of the SC (sequence count) from 0 to 7, 11f a P/non-P format decision unit, and 11g a CSI rewriting unit.

If an ATM cell output from the configuration (FIG. 8) for making the SN check in FIG. 9 is input, it is sequentially stored in the dual port RAM 11a. Simultaneously, the SC decoder 11d decodes which of 0 to 7 the SC (sequence count) of the SAR header in the AAL1 cell is. When the decoded output is supplied to the SC classified register 11e, the one register corresponding to the SC is activated and the CSI bit of the input cell or, if existing, the flag indicating invalidity or a dummy cell is stored in the register. The CSI bits of the cells of SC=0 to 7 and the existence of the invalidity flag and dummy flag are decided by the P-/non-P format decision unit 11f, and the states explained in FIG. 2 and FIG. 3 are decided. In accordance with the output of the decision, the CSI rewriting unit 11g for rewriting the CSI bits of cells is activated and the P-format is set. Further, when there is no P-format cell in the 8 cells, 127 is set in the offset field of the SC=6 cell. This control operation is also performed by activating the write control unit 11b by the output of the P-/non-P format decision unit 11f.

Figure 10:
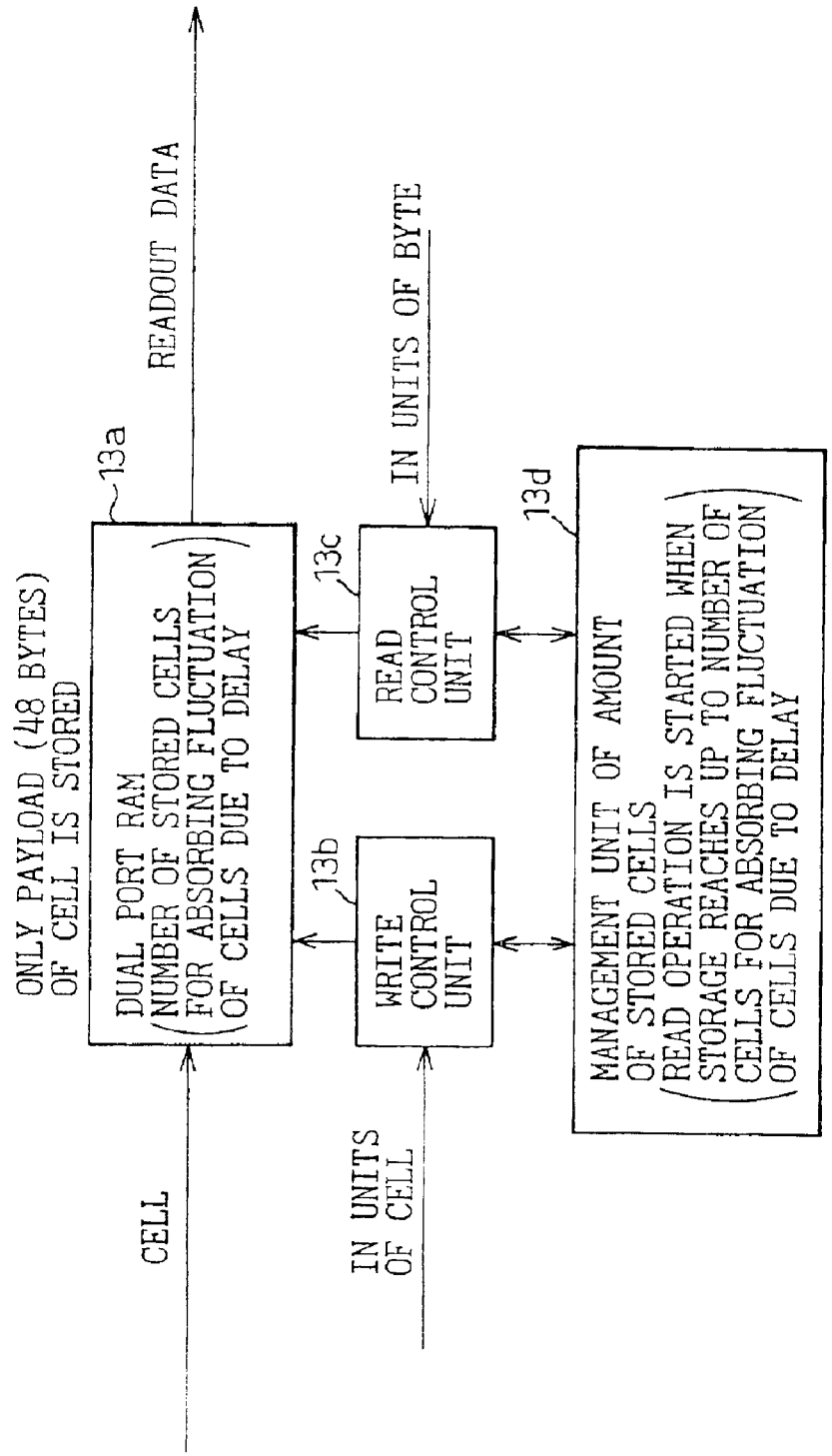
FIG. 10 is a view of the configuration of an embodiment of a reassembly buffer.

FIG. 10 shows the configuration of an embodiment of a reassembly buffer and shows a specific example of the configuration of a reassembly buffer 13 in the first to third basic configurations (FIG. 1, FIG. 4, and FIG. 6) of the present invention. In FIG. 10, 13a is a dual port RAM, 13b is a write control unit, 13c is a read control unit, and 13d is a management unit of the amount of stored cells.

When the dual port RAM 13a receives as input the cells from the previous 8-cell buffer 11 (case of first basic configuration) or SN check unit 10 (case of second and third basic configurations), just the payload of the cells (48 bytes including SAR header) is written in cell units under the control of the write control unit 13b and a signal indicating a write operation is supplied to the management unit of the amount of stored cells 13d. The cells written in the dual port RAM 13a are read by activating the read control unit 13c in accordance with the generation of a signal of byte units instructing reading from the later data reassembly unit 14 (first basic configuration), frame adjusting unit 15 (second basic configuration), or bandwidth adjusting unit 16 (third basic configuration), and generating a read signal from the unit 13c to output it to both the dual port RAM 13a and management unit of amount of stored cells 13d, and outputting the read data to the later units in byte units. The management unit of the amount of stored cells 13d receives the write signal and the read signal, stores the cells until the number of cells for absorbing fluctuation of cells due to delay, then performs control for reading them out.

Figure 11:
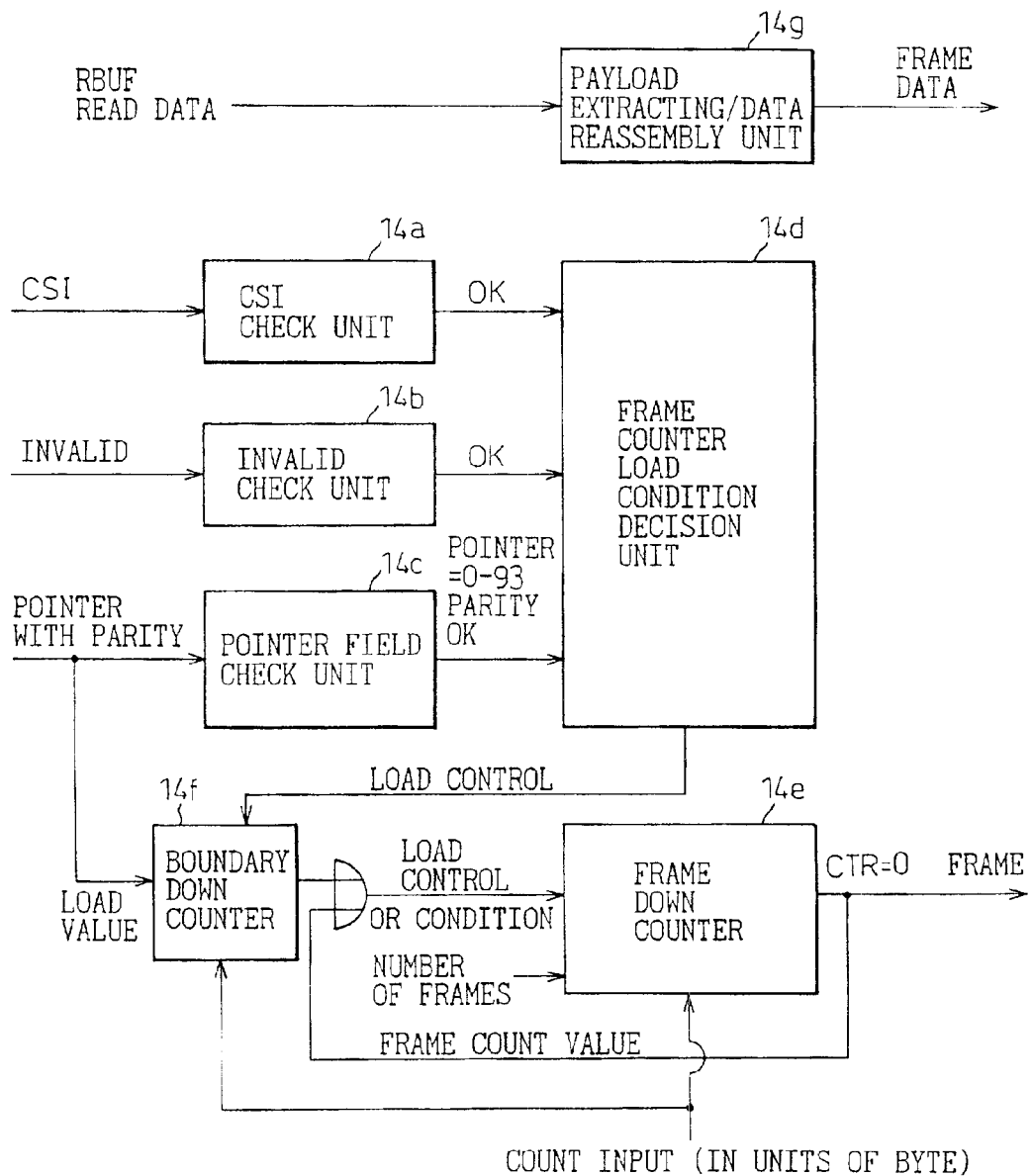
FIG. 11 is a view of the configuration of an embodiment of a data reassembly unit.

FIG. 11 is a view of the configuration of an embodiment of a data reassembly unit and shows a specific example of the configuration of the data reassembly unit 14 provided in the first to third basic configurations (FIG. 1, FIG. 4, and FIG. 6) of the present invention.

In FIG. 11, reference numeral 14a indicates a CSI check unit, 14b an invalid check unit, 14c a pointer field check unit, 14d a frame counter load condition decision unit, 14e a frame down counter for loading the value of the frame period used and counting down from it, 14f a boundary down counter for loading the pointer value in the cell and counting down from it, and 14g a payload extracting data reassembly unit.

The data reassembly unit shown in FIG. 11 receives as input from the previous reassembly buffer (first basic configuration of FIG. 1), frame adjusting unit (second basic configuration of FIG. 4), or bandwidth adjusting unit (third basic configuration of FIG. 6) a CSI bit of the SAR header for every cell, flag showing an invalid cell, and pointer including parity. The input CSI is checked if it is 1 or 0 by the CSI check unit 14a, the flag showing invalidity is checked if it indicates invalidity by the invalid check unit 14b, and the pointer including the parity is checked for value of 0 to 93 and if the parity is OK by the pointer field check unit 14c. When the frame counter load condition decision unit 14d detects that the CSI is 1 and the invalid flag is not set and that the result of the check of the pointer field is OK, it inputs the load control signal to the boundary down counter 14f and loads the pointer (value of 0 to 93) at that time in the boundary down counter 14f as the load value.

Next, the boundary down counter 14f counts down from the input generated in byte units. When the count reaches 0, it generates a load pulse output from the output terminal and outputs a load control signal to the frame down counter 14e. Due to this, the frame down counter 14e loads the predetermined number of frames and counts down by the count input (byte units). So long as no new load pulse is input, it displays the starting position of the frame of the structured data at the frame period. Further, when generating output showing that the count has reached 0, the frame down counter 14e passes it through an OR circuit obtaining an OR with the output of the boundary down counter 14f and inputs that OR output as a load control signal of the frame down counter 14e.

Figure 12:
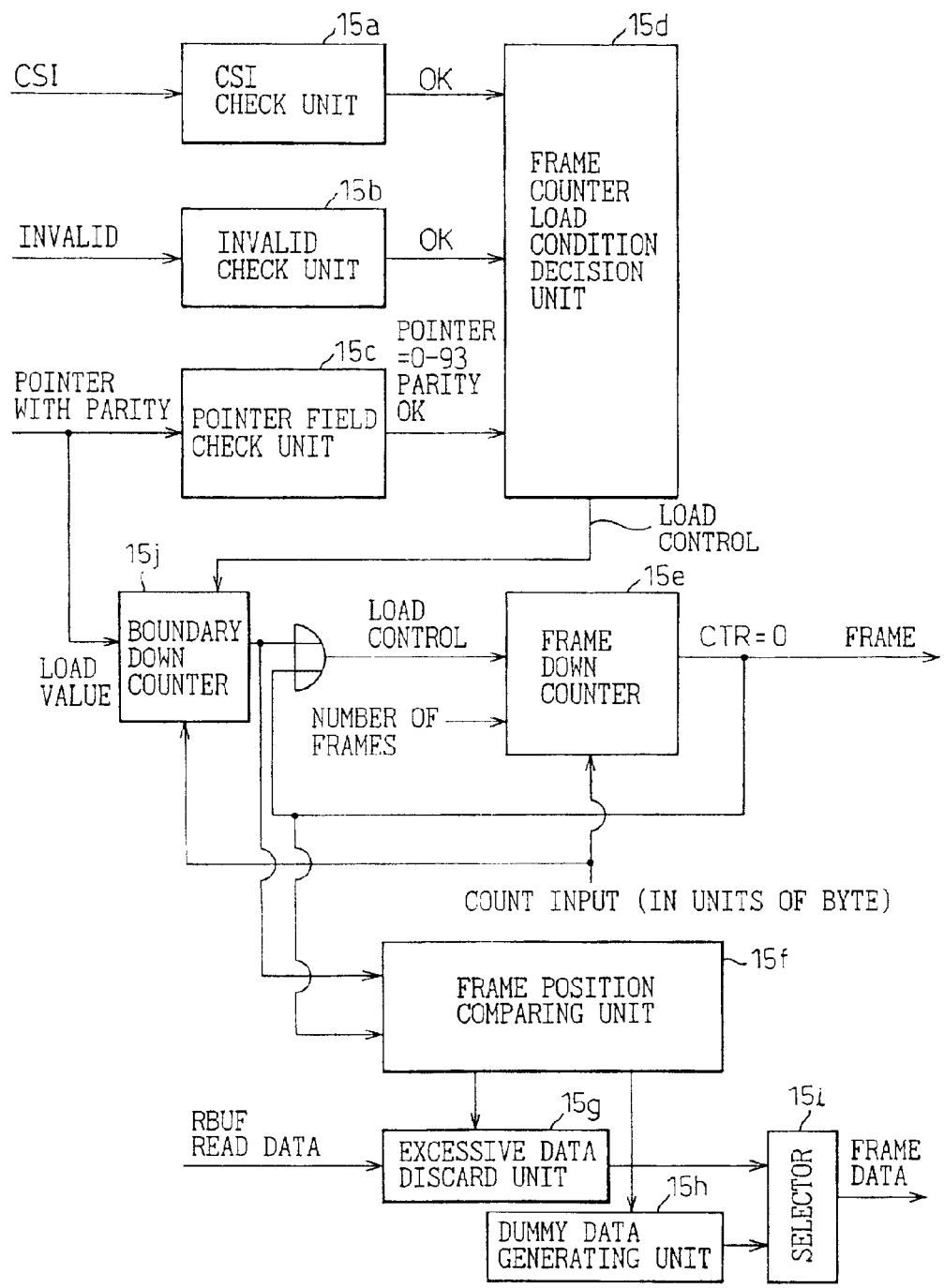
FIG. 12 is a view of the configuration of an embodiment of a frame adjusting unit.

FIG. 12 is a view of the configuration of an embodiment of the frame adjusting unit and shows an example of the specific configuration of a frame adjusting unit 150 in the second basic configuration (FIG. 2) of the present invention.

In FIG. 12, reference numerals 15a to 15e indicate elements of the same name as those of 14a to 14e of FIG. 11. Reference numeral 15a is a CSI check unit, 15b an invalid check unit, 15c a pointer field check unit, 15d a frame counter load condition decision unit, and 15e a frame down counter. Reference numeral 15f is a frame position comparing unit, 15g is an excessive data discard unit, 15h is a dummy data generating unit, 15i is a selector, and 15j is a boundary down counter.

The frame adjusting unit of FIG. 12 receives as input from the previous cell reassembly unit (FIG. 4) a CSI bit of the SAR header for every cell, a flag indicating an invalid cell, and a pointer including parity. In the same way as in FIG. 11, the CSI check unit 15a, invalid check unit 15b, and pointer field check unit 15c perform their various checks and the pointer is loaded in the boundary down counter 15j under the control of the frame counter load condition decision unit 15d. The boundary down counter 15j and the frame down counter 15e perform similar operations as with the boundary down counter 14f and frame down counter 14e of FIG. 11. When the count of the boundary down counter 15j becomes "0", the unit issues a load control signal to the frame down counter 15e and a predetermined number of frames is loaded in the counter 15e. The frame down counter 15e also runs by itself and counts down. When generating the count "0", it generates a frame output (shown by "frame" in the figure) of structured data at the frame period. That output is input as a load control signal to the counter 15j.

In this configuration of the frame adjusting unit, the signal from the output terminal of the frame down counter 15e ("0" value output of frame count or down count) is supplied to the frame position comparing unit 15f as well where it is compared with the output of the load pulse signal of the boundary down counter 15j of the other input of the comparing unit 15f (or where the pointer value and the frame count are compared). The timing of generation of the load control signal of the boundary down counter 15j relative to the timing of generation of the output from the frame down counter 15e (generation of boundary position) is compared as shown in FIG. 5.

If no load pulse output of the boundary down counter 15j is generated when a frame pulse signal is output by the run cycle of the frame down counter 15e, the frame position comparing unit 15f deems the data output until the load pulse output signal is output as excessive data and activates the excessive data discard unit 15g to make it discard the excessive data from the data read from the reassembly buffer (RBUF). The timing relationship of the internal frame and the received data in this case is shown in (1) of FIG. 5.

If a load pulse signal of the boundary down counter 15j is output before the frame pulse signal of the frame down counter 15e is output, the frame position comparing unit 15f deems the data until the frame pulse signal has been output from the frame down counter 15e to be short and activates the dummy data generating unit 15h to compensate for the short data. Due to this, it generates dummy cells corresponding to the short number of bytes. The timing relationship between the internal frames and the received data in this case is shown in (2) of FIG. 5.

The selector 15i is switched to select one of the read data (data passing through the excessive data discard unit 15g) or output of the dummy data generating unit 15h and outputs this to the later data reassembly unit (14 in FIG. 4).

Figure 13:
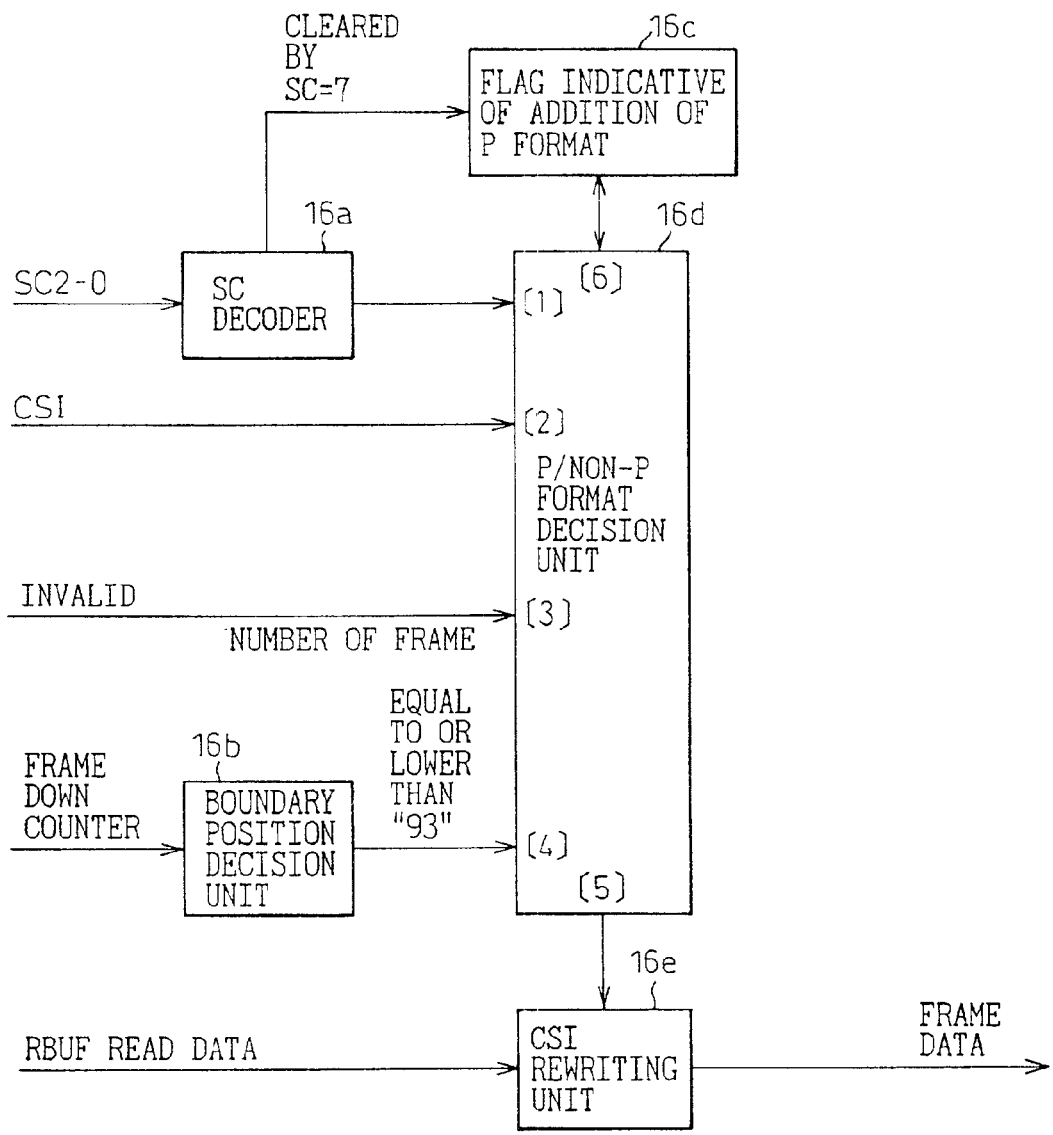
FIG. 13 is a view of the configuration of an embodiment of a bandwidth adjusting unit.

FIG. 13 is a view of the configuration of an embodiment of a bandwidth adjusting unit and shows a specific example of the configuration of the bandwidth adjusting unit 16 in the third basic configuration of the present invention (FIG. 6). Further, FIG. 14 shows an example of the configuration of a table provided in the bandwidth adjusting unit. Specifically, this table is provided in the P/non-P format decision unit of FIG. 13.

In FIG. 13, reference numeral 16a shows an SC decoder, 16b a boundary position decision unit, 16c a P format added flag storage unit, 16d a P/non-P format decision unit, and 16e a CSI rewriting unit.

The bandwidth adjusting unit shown in FIG. 13 is supplied from the previous reassembly buffer 13 (FIG. 6) with the SC2-0 (3 bits of sequence counter), CSI (1 bit for display of CS), invalid flag showing if the cell has an invalid SN, and output of the frame down counter (not included in previous reassembly buffer 13 (FIG. 7)—counter in bandwidth adjusting unit of FIG. 13 (not shown)). The 3 bits of the SC2-0 are decoded by the SC decoder 16a. The result is input to the input terminal [1] of the P/non-P format decision unit 16d, the CSI is supplied to the input terminal [2], and the invalid flag is input to the input terminal [3]. Further, the boundary position decision unit 16b decides if the boundary of the frame is located between the related received even number cell and the next odd number cell (pointer is less than frame number "93") and if it is, outputs "1" as the value of the frame down counter, while if it is not, outputs "0". The P format added flag storage unit 16c is set by the P/non-P format decision unit 16d and is referred to in the decision. When a SC=7 output is generated from the SC decoder 16a, the P format added flag storage unit 16c is cleared.

The decision operation of the P/non-P format decision unit 16d will be explained next using FIG. 14. The meanings of the columns in FIG. 14 are as follows: "SC" is the input of the input terminal [1] of FIG. 13 and takes the value of the sequence count (value of one of 0 to 7). "CSI" is the CS indication bit of the input of the input terminal [2] of FIG. 13. "invalid" is the invalidity flag of the input of the input terminal [3] of FIG. 13. If this is "0", it indicates a valid cell, while if it is "1", it indicates an invalid cell. The next "frame counter" shows the result of the decision of the frame boundary position using the input of the input terminal [4] of FIG. 13. If this is "0", it indicates there is no boundary between a received cell and the next cell, while if it is "1", it indicates there is a boundary between the received cell and next cell.

Further, the "P format added" column indicates the state of the P format added flag storage unit 16c of FIG. 13. If this is "0", it indicates that there is no P format cell between the cell of SC=0 to the currently received cell, while if it is "1", it indicates that there is a P format cell between the cell of SC=0 to the currently received cell. The "decision processing" column indicates the result of the decision of the P/non-P format decision unit 16d. The output is supplied from the output terminal [5] to the CSI rewriting unit 16e, the CSI of the read data from the previous reassembly buffer is rewritten by the result of decision, and the result is output as the frame data.

Explaining the content of decision of FIG. 14, when the received SC is 0, 2, and 4 and the cells have CSI=1 and are not invalid cells, the cells are made the P format. In this case, it is determined that normal P format cells indicating boundaries have been received. Further, when the received SC is 0, 2, and 4 and it is shown by the frame down counter that there is a boundary between the received even number cells and the next odd number cells, the cells are unconditionally made the P format. In this case, the frame down counter determines that the received cells are P format ones indicating boundaries. Further, when the SC is 0, 2, and 4 in the same way as the above and no boundary is indicated by the frame down counter between the received even number cell and the next odd number cell, that cell is determined as the non P format.

When the received cell is of an odd SC, that cell is unconditionally made a non-P format. In this case, the unit decides the cell to be a non-P format since an odd number cell will never become the P format. When the received cell has an SC of 6, if no P format cell has been received from the cell of SC=0 to the currently received cell, that cell is unconditionally made the P format. In this case, it decides on a P format compulsorily since there is always one P format cell in a cycle.

Further, when the received cells have SC=0, 2, and 4 and a P format cell has already been received from the cell of SC=0 to the currently received cell and that cell has an CSI=1 and is not an invalid cell, that cell is made the P format.

When the received cells have SC=0, 2, and 4 and a P format cell has already been received from cell of SC=0 to the currently received cell and the frame down counter shows a boundary between the received even number cell and the next odd number cell, that cell is made the P format. When the received cells have SC=0, 2, and 4 and no P format cell has been received from the cell of SC=0 to the currently received cell and the frame down counter does not indicate a boundary between the received even number cell and the next odd number cell, that cell is made the non-P format.

In the configuration of the embodiment of FIG. 13 explained above, the compensation for cell loss or overlap of over 8 cells is incomplete, so it is effective to combine this embodiment with the second embodiment of the present invention.

The configurations of the embodiments of the parts shown from FIG. 7 to FIG. 13 are used for realizing the first to third basic configurations of the present invention, but these basic configurations may be combined as well.

Summarizing the effects of the invention, as explained above, according to the present invention, when a P format cell is included at the time of multiple bit error including the CSI bit or at the time of addition of dummy cells, it is possible to correctly determine the P format or non-P format. Therefore, it is possible to solve the problems of the data length not matching when reassembling cells or the frame format structure lost due to mismatch of the data rates between the transmitting and receiving ends or deviation in data in a frame arising before a cell indicating the next boundary (frame) arrives.

While the invention has been described with reference to specific embodiment chosen for purpose of illustration, it should be apparent that numerous modifications could be made thereto by those skilled in the art without departing from the basic concept and scope of the invention.

What is claimed is:

1. A system for controlling a bandwidth when receiving and reassembling a consecutive data stream transferred while segmented by AAL1 format cells, comprising
    an 8-cell buffer, in a data reassembly unit which reassembles received cells, for storing 8 cells of a cycle of a sequence count (SC) of 0 to 7 and sending the cells out to a later stage after a check unit of a sequence number (SN) field confirms normalcy of the cells and
    a control unit for control so that the number of P format cells stored in said 8-cell buffer becomes 1 cell when 8 cells are stored in said 8-cell buffer.

2. A system for controlling bandwidth as set forth in claim 1, wherein the system sets a cell of the sequence count 6 as a P format cell unconditionally when detecting that the cells stored in the 8-cell buffer do not include a P format cell.

3. A system for controlling bandwidth as set forth in claim 1, wherein the system sets as a P-format cell a cell of the largest even number sequence count (SC) among a plurality of dummy cells or cells where the sequence number (SN) field is invalid when the cells stored in the 8-cell buffer do not include a P-format cell and there are a plurality of one or both of dummy cells or cells where the sequence number (SN) field is invalid.

4. A system for controlling bandwidth as set forth in claim 1, wherein the system sets as a non-P format cell unconditionally any cell of a sequence number (SN) field of an odd number sequence count (SC) which is a P format cell among the cells stored in the 8-cell buffer.

5. A system for controlling bandwidth as set forth in claim 1, wherein the system sets as a non-P format cell any cell except a cell of the largest even number sequence count (SC) when there are a plurality of P-format cells in the cells stored in the 8-cell buffer.

6. A system for controlling AAL1 cell bandwidth when reassembling a consecutive data stream having a frame structure transferred while segmented by cells of an AAL1 structured data transfer format, the system including
    an internal frame counter made to run by itself and synchronized in frame phase by a boundary position of a frame set in a pointer field after confirming normalcy of a sequence number field of received cells and
    said internal frame counter monitors the number of bytes of the received data and discards excess data when detecting that the boundary position of a frame is later than the period of the internal frame counter.

7. A system for controlling bandwidth as set forth in claim 6, wherein the system compensates for short data using dummy data when detecting that the boundary position of the frame is earlier than the period of the internal frame counter when monitoring the number of bytes of the received data by the internal frame counter.

8. A system for controlling AAL1 cell bandwidth when reassembling a consecutive data stream having a frame structure transferred while segmented by cells of an AAL1 structured data transfer format, the system including
    a bandwidth adjusting unit for adjusting a data rate between transmitting and receiving ends after confirming normalcy of a sequence number field of a received cell and
    said bandwidth adjusting unit has an internal frame counter made to run by itself and synchronized in frame phase by a boundary position of a frame set in a pointer field, and
    said bandwidth adjusting unit adjusts the bandwidth by determination and control of a P/non-P format cell based on a CSI bit, sequence count (SC), flag for discriminating a cell with an invalid sequence number (SN) field, result of detection of whether a P format cell already exists in one cycle between a sequence count of 0 and a currently received cell, and a result of discrimination of whether there is a boundary position between a received even number cell and the next odd number cell by said internal frame counter.

9. A system for controlling bandwidth as set forth in claim 8, wherein the system concludes that there is a boundary in one of a received even number cell and the next odd number cell and making the cells a P format when the number of frames as counted by the internal frame counter is 93.

10. A system for controlling bandwidth as set forth in claim 8, wherein the system making a cell of a sequence count (SC) of 6 a P format cell unconditionally when no P-format cell is received in one cycle of the sequence count.

11. A system for controlling bandwidth when receiving and reassembling a consecutive data stream transferred while segmented by AAL1 format cells, comprising
    a cell buffer, in a data reassembly unit which reassembles received cells, for storing one cycle's worth of a number of cells and sending the cells out to a later stage after a check unit of a sequence number (SN) field confirms normalcy of the cells and
    a control unit for control so that the number of P format cells stored in said cell buffer becomes 1 cell when the above number of cells are stored in said cell buffer.

* * * * *